US012408089B2

(12) United States Patent
Jung et al.

(10) Patent No.: US 12,408,089 B2
(45) Date of Patent: Sep. 2, 2025

(54) METHOD AND APPARATUS FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Ikjoo Jung, Seoul (KR); Ilhwan Kim, Seoul (KR); Jongku Lee, Seoul (KR); Sunam Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 17/912,939

(22) PCT Filed: Mar. 25, 2020

(86) PCT No.: PCT/KR2020/004025

§ 371 (c)(1),
(2) Date: Sep. 20, 2022

(87) PCT Pub. No.: WO2021/193989

PCT Pub. Date: Sep. 30, 2021

(65) Prior Publication Data

US 2023/0319656 A1 Oct. 5, 2023

(51) Int. Cl.

| | |
|---|---|
| ***H04W 36/00*** | (2009.01) |
| ***G06N 3/045*** | (2023.01) |
| ***G06N 3/08*** | (2023.01) |
| ***H04W 36/08*** | (2009.01) |

(52) U.S. Cl.

CPC ........ *H04W 36/0072* (2013.01); *G06N 3/045* (2023.01); *G06N 3/08* (2013.01); *H04W 36/0061* (2013.01); *H04W 36/08* (2013.01)

(58) Field of Classification Search

None

See application file for complete search history.

(56) References Cited

U.S. PATENT DOCUMENTS

| | | | |
|---|---|---|---|
| 9,008,664 B2 | 4/2015 | Rahman et al. | |
| 2013/0343288 A1 | 12/2013 | Ratasuk et al. | |
| 2015/0341799 A1 | 11/2015 | Zhang et al. | |
| 2021/0250872 A1* | 8/2021 | Takeda ................ | H04W 52/245 |
| 2022/0385516 A1* | 12/2022 | Atungsiri ............ | H04L 27/2646 |

FOREIGN PATENT DOCUMENTS

| | | |
|---|---|---|
| WO | WO2017137089 | 8/2017 |
| WO | WO2017184190 | 10/2017 |

OTHER PUBLICATIONS

International Search Report in International Appln. No. PCT/KR2020/004025, dated Dec. 4, 2020, 5 pages (with English translation).

* cited by examiner

*Primary Examiner* — Adolf Dsouza

(74) *Attorney, Agent, or Firm* — Fish & Richardson P.C.

(57) ABSTRACT

A terminal in a wireless communication system receives configuration information from a base station, and receives data on the basis of the configuration information. The configuration information includes information about a first receiver model and a first zone to which the base station belongs, the first zone includes one or more base stations adjacent to the base station, and the first receiver model is generated on the basis of a combination of receiver models that are trained by the base stations within the first zone, according to a machine learning step.

15 Claims, 22 Drawing Sheets

(a) signal-flow diagram of an iterative algorytm (b) Data-driven tuning

<amended>

| Zone number | AI PHY receiver list | AI PHY receiver version information | Total usage time of AI PHY receiver | Recent usage time | Number of times of recent usage |
|---|---|---|---|---|---|
| 1 | AI PHY receiver-Zone 1 | v2.0 | 2 minutes | 2019-11-9 13:00 | 3 |
| 2 | AI PHY receiver-Zone 2 | v1.0 | 1 minute | Running | 2 |

FIG. 21

| Zone number | AI PHY receiver list | AI PHY receiver version information | Total usage time of AI PHY receiver | Recent usage time | Number of times of recent usage |
|---|---|---|---|---|---|
| 100 | AI PHY receiver-House | v1.0 | 8 hours | 2019-11-9 7:00 | 1 |
| 1 | AI PHY receiver-Zone 1 | v2.0 | 2 minutes | 2019-11-9 13:00 | 3 |
| 2 | AI PHY receiver-Zone 2 | v1.0 | 1 minute | Running | 2 |

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2020/004025, filed on Mar. 25, 2020, the disclosure of which is hereby incorporated by reference herein in its entirety.

TECHNICAL FIELD

The present document relates to a method and apparatus for transmitting and receiving data in a wireless communication system and, more particularly, to a method of detecting and receiving data based on machine learning and an apparatus supporting the same.

BACKGROUND ART

Wireless access systems have been widely deployed to provide various types of communication services such as voice or data. In general, a wireless access system is a multiple access system that supports communication with multiple users by sharing available system resources (bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In addition, the present document may be related to the following technical configurations.

<Artificial Intelligence (AI))>

AI refers to a field that studies artificial intelligence or methodology capable of achieving artificial intelligence. Machine learning refers to a field that defines various problems handled in the AI field and studies methodology for solving the problems. Machine learning may also be defined as an algorithm for raising performance for any task through steady experience of the task.

An artificial neural network (ANN) may refer to a model in general having problem solving capabilities, that is composed of artificial neurons (nodes) constituting a network by a combination of synapses, as a model used in machine learning. The ANN may be defined by a connection pattern between neurons of different layers, a learning process of updating model parameters, and/or an activation function for generating an output value.

The ANN may include an input layer, an output layer, and, optionally, one or more hidden layers. Each layer includes one or more neurons and the ANN may include a synapse connecting neurons. In the ANN, each neuron may output input signals, which are input through the synapse, weights, and function values of an activation function for deflection.

A model parameter refers to a parameter determined through learning and includes a weight of synaptic connection and a deflection of a neuron. A hyperparameter refers to a parameter that should be configured before learning in a machine learning algorithm and includes a learning rate, the number of repetitions, a mini batch size, an initialization function, and the like.

The purpose of learning of the ANN may be understood as determining the model parameter that minimizes a loss function. The loss function may be used as an index to determine an optimal model parameter in a learning process of the ANN.

Machine learning may be classified into supervised learning, unsupervised learning, and reinforcement learning, according to a learning scheme.

Supervised learning refers to a method of training the ANN in a state in which a label for training data is given. The label may represent a correct answer (or result value) that the ANN should infer when the training data is input to the ANN. Unsupervised learning may refer to a method of training the ANN in a state in which the label for the training data is not given. Reinforcement learning may refer to a learning method in which an agent defined in a certain environment is trained to select a behavior or a behavior order that maximizes accumulative compensation in each state.

Among ANNs, machine learning implemented as a deep neural network (DNN) including a plurality of hidden layers is also called deep learning. Deep learning is a part of machine learning. Hereinbelow, machine learning includes deep learning.

DISCLOSURE

Technical Problem

The present document relates to a method and apparatus for detecting and receiving data based on machine learning.

More specifically, the present document proposes a communication procedure and application method of enabling an AI receiver, which is proposed to improve data transmission and reception of a user equipment and is trained based on a zone of a base station, to be used according to the state of the user equipment.

More specifically, the present document relates to a method and apparatus for applying AI technology according to cell selection, cell reselection, and handover of a user equipment in a transmission and reception operation of a physical layer of wireless communication.

More specifically, the present document proposes a communication method and apparatus for enabling an AI receiver, which is proposed to improve data transmission and reception of a user equipment and is trained based on a zone of a base station, to be used according to the state of the user equipment.

The objects to be achieved by the present document are not limited to what has been particularly described hereinabove and other objects not described herein will be more clearly understood by persons skilled in the art to which the present document belongs from the embodiments of the present document to be described hereinbelow.

Technical Solution

The present document relates to a method and apparatus for transmitting and receiving data in a wireless communication system.

According to an aspect of the present disclosure, provided herein is a method of transmitting and receiving data by a user equipment in a wireless communication system, including receiving configuration information from a base station; and receiving data based on the configuration information. The configuration information includes information about a first zone to which the base station belongs and about a first receiver model. The first zone includes one or more base stations adjacent to the base station. The first receiver model is generated based on a combination of receiver models trained according to a machine learning process by the base stations within the first zone.

In another aspect of the present disclosure, provided herein is a user equipment for transmitting and receiving data in a wireless communication system, including a transceiver; and a processor. The transceiver receives configuration information from a base station and receives data based on the configuration information. The configuration information includes information about a first zone to which the base station belongs and about a first receiver model. The first zone includes one or more base stations adjacent to the base station. The first receiver model is generated based on a combination of receiver models trained according to a machine learning process by the base stations within the first zone.

In another aspect of the present disclosure, provided herein is a method of transmitting and receiving data by a base station in a wireless communication system, including transmitting configuration information to a user equipment; and transmitting data based on the configuration information. The configuration information includes information about a first zone to which the base station belongs and about a first receiver model. The first zone includes one or more base stations adjacent to the base station. The first receiver model is generated based on a combination of receiver models trained according to a machine learning process by the base stations within the first zone.

In another aspect of the present disclosure, provided herein is a base station for transmitting and receiving data in a wireless communication system, including a transceiver; and a processor. The transceiver transmits configuration information to a user equipment and transmits data based on the configuration information. The configuration information includes information about a first zone to which the base station belongs and about a first receiver model. The first zone includes one or more base stations adjacent to the base station. The first receiver model is generated based on a combination of receiver models trained according to a machine learning process by the base stations within the first zone.

In another aspect of the present disclosure, provided herein is an apparatus for a user equipment, including at least one processor; and at least one computer memory operably connectable to the at least one processor and storing instructions that, when executed, cause the at least one processor to perform operations. The operations include receiving configuration information from a base station; and receiving data based on the configuration information. The configuration information includes information about a first zone to which the base station belongs and about a first receiver model. The first zone includes one or more base stations adjacent to the base station. The first receiver model is generated based on a combination of receiver models trained according to a machine learning process by the base stations within the first zone.

In another aspect of the present disclosure, provided herein is a computer readable storage medium storing at least one computer program including instructions that, when executed by at least one processor, cause the at least one processor to perform operations. The operations include receiving configuration information from a base station; and receiving data based on the configuration information. The configuration information includes information about a first zone to which the base station belongs and about a first receiver model. The first zone includes one or more base stations adjacent to the base station. The first receiver model is generated based on a combination of receiver models trained according to a machine learning process by the base stations within the first zone.

The machine learning process may include (1) learning respective receiver models by the base stations within the first zone, (2) transmitting the learned received models to a master base station by the base stations within the first zone, (3) generating, by the master base station, a final receiver model by combining the learned receiver models, (4) transmitting, by the master base station, the final receiver model to the base stations within the first zone, (5) re-learning, by the base stations within the first zone, the respective receiver models based on the final receiver model, and repeating processes of (2) to (5) a predetermined number of times. The master base station may be a base station selected from among the base stations within the first zone. The first receiver model may be generated based on the final receiver model.

The method may further include reselecting a cell; and receiving information about a second receiver model related to the reselected cell. The first receiver model and the second receiver model may be different from each other.

The method may further include determining whether the second receiver model is updated. The reselected cell may be a cell of a base station included in the first zone.

The method may further include receiving data using the first receiver model based on non-updating of the second receiver model, and receiving data using the second receiver model based on updating of the second receiver model.

The method further include storing the first receiver model in a receiver list. The receiver list may be used based on a predetermined condition and may include at least one of information about a zone to which the user equipment belongs, a receiver model, a total usage time of a receiver, a recent usage time of a receiver, or the number of times of recent usage of a receiver. The predetermined condition may be movement of the user equipment from a zone to which the user equipment currently belongs to another zone.

The machine learning process may use an ensemble learning method.

The above-described aspects of the present document are merely a part of the exemplary embodiments of the present document, and various embodiments into which technical features of the present document are incorporated may be derived and understood by those skilled in the art from the following detailed description of the present document.

Advantageous Effects

According to the present document, base stations having similar channel environments are grouped as one zone and a large amount of data is secured based on data exchange between the base stations formed as the zone, so that an AI receiver may be trained/re-trained to be more improved in terms of data transmission and reception.

According to the present document, data may be stably transmitted and received by reducing delay time which may occur when a user equipment frequently switches between AI receivers as compared with the case in which each base station includes an AI-applied physical receiver (hereinafter, an AI receiver).

According to the present document, a procedure of efficiently applying a receiver associated with cell selection, cell reselection, and handover of a user equipment is proposed.

The effects that can be achieved through the embodiments of the present disclosure are not limited to what has been particularly described hereinabove and other effects which are not described herein can be derived by those skilled in the art from the following detailed description.

BRIEF DESCRIPTION OF DRAWINGS

The accompanying drawings, which are included to provide a further understanding of the disclosure and are incorporated in and constitute a part of this specification, illustrate embodiments of the disclosure.

FIG. 21 is an exemplary diagram illustrating an AI receiver list according to the present disclosure.

BEST MODE

Figure 1A:
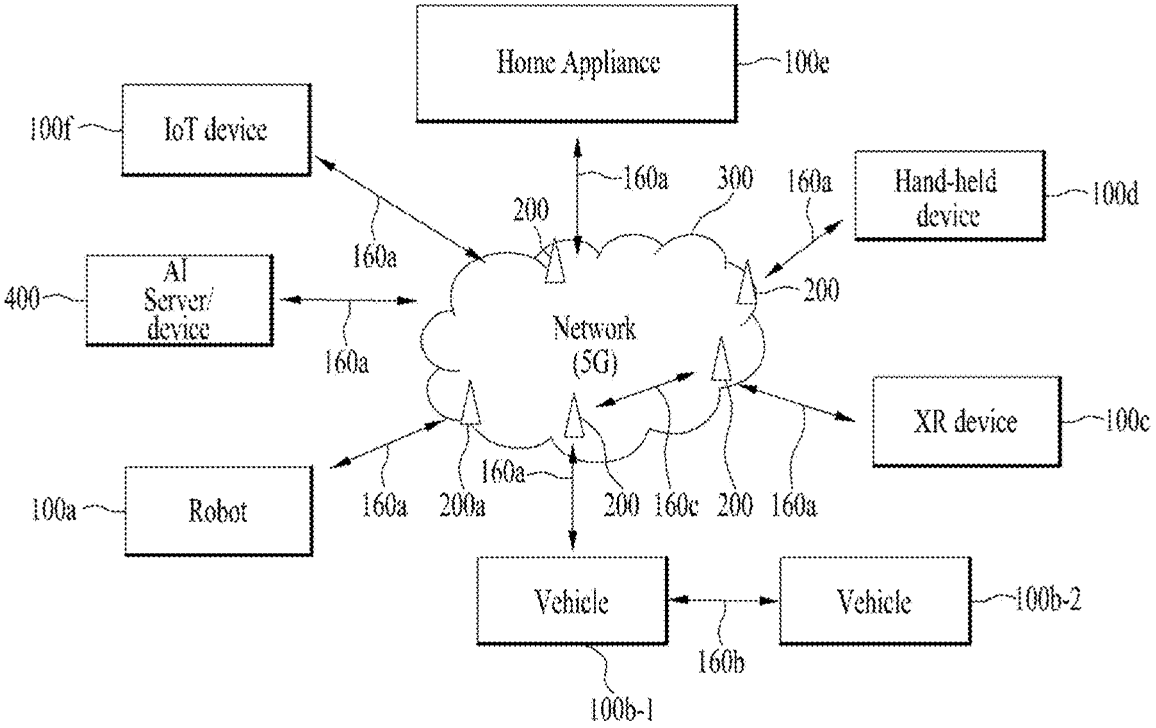
FIG. 1A illustrates a communication system applied to the present disclosure.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details. For example, while the following detailed description is given under the assumption that a mobile communication system is a 3GPP LTE or LTE-A system, the mobile communication system is applicable to other arbitrary mobile communication systems except for matters that are specific to the 3GPP LTE or LTE-A system. In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

In the following description, downlink (DL) refers to communication from a base station (BS) to a user equipment (UE), and uplink (UL) refers to communication from the UE to the BS. On DL, a transmitter may be a part of the BS and a receiver may be a part of the UE. On UL, the transmitter may be a part of the UE and the receiver may be a part of the BS. In the present disclosure, the BS may be represented as a first communication device and the UE may be represented as a second communication device. The BS may be replaced with the term “fixed station”, “Node B”, “evolved-Node B (eNB)”, “next generation Node B (gNB)”, “base transceiver system (BTS)”, “access point (AP)”, “network or 5G network node”, “AI system”, “roadside unit (RSU)”, or “robot”. The UE may be replaced with the term “terminal”, “mobile station (MS)”, “user terminal (UT)”, “mobile subscriber station (MSS), “subscriber station (SS)”, “advanced mobile station (AMS)”, “wireless terminal (WT)”, “machine-type communication (MTC) device”, “machine-to-machine (M2M) device”, “device-to-device (D2D) device”, “vehicle”, “robot”, or “AI module”.

Technology described below may be used in various radio access systems such as a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system. CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as institute of electrical and electronics engineers (IEEE) 802.11 (Wi-Fi), IEEE 802.16 (WiMAX), IEEE 802.20, or evolved-UTRA (E-UTRA). UTRA is part of universal mobile telecommunications system (UMTS). 3rd generation partnership project (3GPP) long-term evolution (LTE) is part of evolved UMTS (E-UMTS) using E-UTRA and LTE-advanced (LTE-A)/LTE-A pro is an evolved version of 3GPP LTE. 3GPP new radio or new radio access technology (NR) is an evolved version of 3GPP LTE/LTE-A pro.

For clarity, a description is given based on a 3GPP communication system (e.g., LTE-A or NR) but the scope of the present disclosure is not limited thereto. LTE refers to technology beyond 3GPP TS 36.xxx Release 8. More specifically, LTE technology beyond 3GPP TS 36.xxx Release 10 is referred to as LTE-A, and LTE technology beyond 3GPP TS 36.xxx Release 13 is referred to as LTE-A pro. 3GPP NR refers to technology beyond TS 38.xxx Release 15. LTE/NR may be referred to as a 3GPP system. "xxx" represents a detailed number of a technical specification. LTE/NR may be collectively referred to as a 3GPP system.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, or repeater may be the node. Furthermore, the node may not be the BS. For example, a radio remote head (RRH) or a radio remote unit (RRU) may be the node. Generally, the RRH or RRU has a power level lower than that of the BS. At least one antenna is installed per node. The antenna may refer to a physical antenna or refer to an antenna port, a virtual antenna, or an antenna group. The node may also be called a point.

In the present disclosure, a cell refers to a specific geographic area or a radio resource in or on which one or more nodes provide communication services. The "cell" of the geographic area may be understood as coverage within which a node may provide services using a carrier, and the "cell" of the radio resource is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of a radio resource used by the node. Accordingly, the term "cell" may be used to indicate service coverage by the node sometimes, the radio resource at other times, or a range within which a signal using the radio resource may reach with valid strength at other times.

In the present disclosure, communicating with a specific cell may mean communicating with a BS or a node that provides communication services to the specific cell. A DL/UL signal of the specific cell refers to a DL/UL signal from/to the BS or the node that provides communication services to the specific cell. A cell that provides UL/DL communication services to a UE is especially called a serving cell. Furthermore, channel status/quality of the specific cell refers to status/quality of a channel or a communication link formed between the BS or the node that provides communication services to the specific cell and the UE.

The "cell" associated with the radio resource may be defined by a combination of DL resources and UL resources, i.e., a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information transmitted through a corresponding cell. In this case, the carrier frequency may be equal to or different from a center frequency of each cell or CC. Hereinbelow, a cell operating on a primary frequency will be referred to as a primary cell (Pcell) or a primary CC (PCC), and a cell operating on a secondary frequency will be referred to as a secondary cell (Scell) or a secondary CC (SCC). The Scell may be configured after a UE and a BS perform a radio resource control (RRC) connection establishment procedure and thus RRC connection is established between the UE and the BS, i.e., after the UE is in an RRC_CONNECTED state. RRC connection may mean a path through which RRC of the UE may exchange messages with RRC of the BS. The Scell may be configured to provide additional radio resources to the UE. The Scell may form a set of serving cells for the UE together with the Pcell according to capabilities of the UE. Only one serving cell configured only with the Pcell exists for an RRC_CONNECTED UE which is not configured with carrier aggregation or does not support carrier aggregation.

A cell supports a unique radio access technology (RAT). For example, LTE RAT-based transmission/reception is performed on an LTE cell, and 5G RAT-based transmission/reception is performed on a 5G cell.

Carrier aggregation (CA) refers to technology using a plurality of carriers each having a narrower system bandwidth than a target bandwidth through aggregation to support broadband. CA differs from OFDMA in that DL or UL communication is performed using a plurality of carrier frequencies each forming a system bandwidth (or channel bandwidth) in the former, and DL or UL communication is performed by carrying a base frequency band divided into a plurality of orthogonal subcarriers in one carrier frequency in the latter. In OFDMA or orthogonal frequency division multiplexing (OFDM), for example, one frequency band having a certain system bandwidth is divided into a plurality of subcarriers with a predetermined subcarrier spacing, information/data is mapped to the plurality of subcarriers, and the frequency band to which the information/data has been mapped is transmitted in a carrier frequency of the frequency band through frequency upconversion. In wireless CA, frequency bands each having a system bandwidth and a carrier frequency may be used simultaneously used for communication, and each frequency band used in CA may be divided into a plurality of subcarriers with a predetermined subcarrier spacing.

The 3GPP-based communication standards define DL physical channels corresponding to resource elements (REs) carrying information originated from upper layers of a physical layer (e.g., a medium access control (MAC) layer, a radio link control (RLC) layer, a packet data convergence protocol (PDCP) layer, an RRC layer, a service data adaptation protocol (SDAP) layer, and a non-access stratum (NAS) layer), and DL physical signals corresponding to REs which are used in the physical layer but do not deliver information originated from the upper layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal (RS) and a synchronization signal are defined as the DL physical signals. The RS, also called a pilot, means a signal of a predefined special waveform known to both a BS and a UE. For example, a cell-specific RS (CRS), a UE-specific RS (UE-RS), a positioning RS (PRS), a channel state information RS (CSI-RS), and a demodulation RS (DMRS) are defined as DL RSs. The 3GPP-based communication standards also define UL physical channels corresponding to REs carrying information originated from upper layers, and UL physical signals corresponding to REs which are used in the physical layer but do not carry information originated from the upper layers. For example, a physical uplink shared channel (PUSCH), a physical uplink control channel (PUCCH), and a physical random access channel (PRACH) are defined as the UL physical channels, and a DMRS for a UL control/data signal and a sounding reference signal (SRS) used for UL channel measurement are defined for the UL physical signals.

In the present disclosure, the PDCCH and the PDSCH may refer to a set of time-frequency resources or REs that carry downlink control information (DCI) and DL data, respectively. The PUCCH, PUSCH, and PRACH refer to a set of time-frequency resources or REs that carry uplink control information (UCI), UL data, and random access signals, respectively. In the following description, "the UE transmits a UL physical channel (e.g., a PUCCH, PUSCH, or PRACH)" may mean that the UE transmits the UCI, UL data, or random access signals on or through the UL physical channel, and "the BS receives a UL physical channel" may mean that the BS receives the UCI, UL data, or random access signals on or through the UL physical channel. "The BS transmits a DL physical channel (e.g., a PDCCH or PDSCH)" may mean that the BS transmits the DCI or DL data on or through the DL physical channel, and "the UE receives a DL physical channel" may mean that the UE receives the DCI or DL data on or through the DL physical channel.

In the present disclosure, a transport block (TB) is payload for a physical layer. For example, data provided to the physical layer by an upper layer or a MAC layer is basically referred to as a TB.

In the present disclosure, hybrid automatic repeat and request (HARQ) is a kind of error control technique. HARQ acknowledgement (HARQ-ACK) transmitted on DL is used for error control of UL data, and HARQ-ACK transmitted on UL is used for error control of DL data. A transmitter performing a HARQ operation awaits reception of ACK after transmitting data (e.g., a TB or a codeword). A receiver performing a HARQ operation transmits ACK only when data has been successfully received and transmits negative ACK (NACK) when the received data has an error. Upon receipt of ACK, the transmitter may transmit (new) data, and upon receipt of NACK, the transmitter may retransmit the data. Time delay occurs until a BS receives ACK/NACK from a UE and transmits retransmission data after transmitting scheduling information and data according to the scheduling information. The time delay is generated due to channel propagation delay or time consumed for data decoding/encoding. Accordingly, if new data is transmitted after a HARQ process which is currently in progress is ended, a gap in data transmission occurs due to time delay. In order to prevent the gap in data transmission from occurring during a time delay duration, a plurality of independent HARQ processes is used. For example, when there are 7 transmission occasions between initial transmission and retransmission, a communication device may perform 7 independent HARQ processes to transmit data without any gap. A plurality of parallel HARQ processes enables successive UL/DL transmission while the device awaits HARQ feedback for previous UL/DL transmission.

In the present disclosure, channel state information (CSI) generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

For the background technology, terminology, and abbreviations used in the present disclosure, reference may be made to standard specifications published before the present disclosure. For example, reference may be made to the following documents.

3GPP LTE

3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3

3GPP NR

3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)

3GPP TS 37.340: Multi-connectivity; Overall description

3GPP TS 23.287: Application layer support for V2X services; Functional architecture and information flows 3GPP TS 23.501: System Architecture for the 5G System 3GPP TS 23.502: Procedures for the 5G System 3GPP TS 23.503: Policy and Charging Control Framework for the 5G System; Stage 2

3GPP TS 24.501: Non-Access-Stratum (NAS) protocol for 5G System (5GS); Stage 3

3GPP TS 24.502: Access to the 3GPP 5G Core Network (5GCN) via non-3GPP access networks 3GPP TS 24.526: User Equipment (UE) policies for 5G System (5GS); Stage 3

NR Radio Access

As more and more communication devices demand larger communication capacity, there is a need for enhanced mobile broadband (eMBB) communication relative to legacy RAT. In addition, massive machine type communication (mMTC) for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, mMTC, ultra-reliable and low-latency communication (URLLC), and the like. In the present disclosure, such technology is referred to as NR. NR is an expression representing an example of fifth-generation (5G) RAT.

A new RAT system including NR uses an OFDM transmission scheme or a transmission scheme similar thereto. The new RAT system may follow OFDM parameters different from OFDM parameters of LTE. Alternatively, the new RAT system may follow numerology of legacy LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in the frequency domain. Different numerologies may be defined by scaling a reference subcarrier spacing to an integer N.

FIG. 1A illustrates a communication system 1 applied to the present disclosure.

Referring to FIG. 1A, the communication system 1 applied to the present disclosure includes wireless devices, BSs, and a network. The wireless devices refer to devices performing communication by radio access technology (RAT) (e.g., 5G New RAT (NR) or LTE), which may also be called communication/radio/5G devices. The wireless devices may include, but no limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured by using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f* and the BSs 200, or between the BSs 200. Herein, the wireless communication/connections may be established through various RATs (e.g., 5G NR) such as UL/DL communication 150*a*, sidelink communication 150*b* (or, D2D communication), or inter-BS communication 150*c* (e.g. relay, integrated access backhaul (IAB)). A wireless device and a BS/a wireless devices, and BSs may transmit/receive radio signals to/from each other through the wireless communication/connections 150*a*, 150*b*, and 150*c*. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 1B:
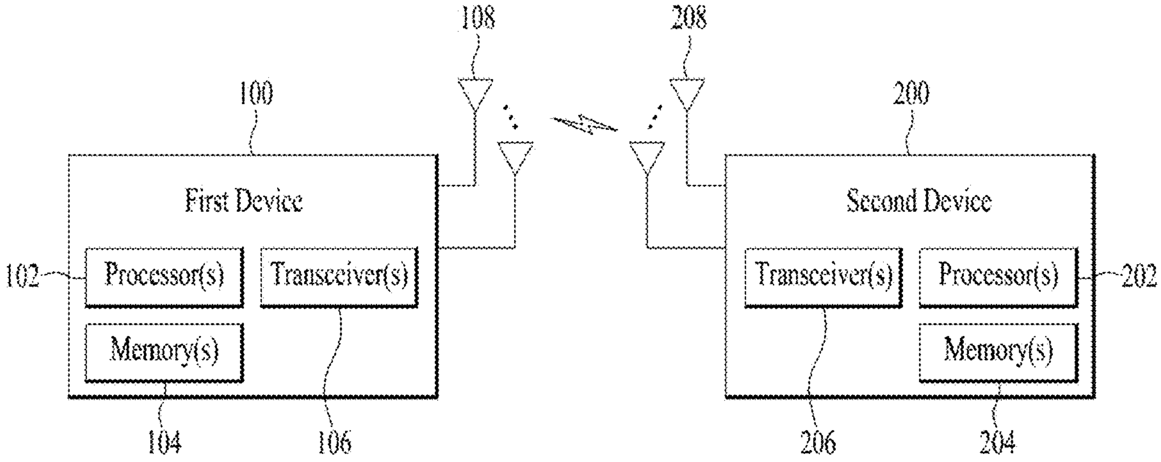
FIG. 1B illustrates wireless devices applicable to the present disclosure.

FIG. 1B illustrates wireless devices applicable to the present disclosure.

Referring to FIG. 1B, a first wireless device 100 and a second wireless device 200 may transmit radio signals through a variety of RATs (e.g., LTE and NR). Herein, {the first wireless device 100 and the second wireless device 200} may correspond to {the wireless devices 100*a* to 100*f* and the BSs 200} and/or {the wireless devices 100*a* to 100*f* and the wireless devices 100*a* to 100*f*} of FIG. 1A.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

The first wireless device 100 and/or the second wireless device 200 may include a single antenna and multiple antennas. If at least one of the first wireless device 100 or the second wireless device 200 includes multiple antennas, a wireless communication system may be called a multiple input multiple output (MIMO) system.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 1C:
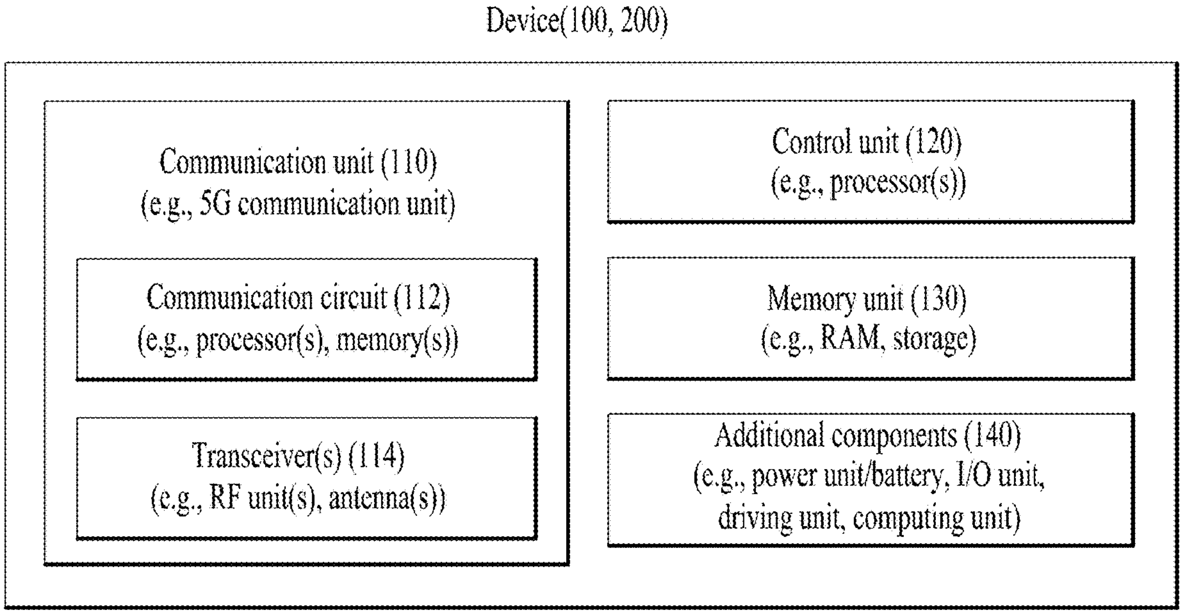
FIG. 1C illustrates other examples of wireless devices applicable to the present disclosure.

FIG. 1C illustrates another example of wireless devices applied to the present disclosure.

The wireless devices may be implemented in various forms according to use-cases/services (refer to FIG. 1A).

Referring to FIG. 1C, wireless devices 100 and 200 may correspond to the wireless devices 100 and 200 of FIG. 1B and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 1B. For example, the transceiver(s) 114 may include the one or more transceivers 106 and 206 and/or the one or more antennas 108 and 208 of FIG. 1B. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100*a* of FIG. 1A), the vehicles (100*b*-1 and 100*b*-2 of FIG. 1A), the XR device (100*c* of FIG. 1A), the hand-held device (100*d* of FIG. 1A), the home appliance (100*e* of FIG. 1A), the IoT device (100*f* of FIG. 1A), a digital broadcasting terminal, a hologram device, a public safety device, an MTC device, a medicine device, a FinTech device (or a finance device), a security device, a climate/environment device, the AI server/device (400 of FIG. 1A), the BSs (200 of FIG. 1A), a network node, etc. The wireless device may be mobile or fixed according to a use-case/service.

In FIG. 1C, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled by wire, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

According to the present disclosure, a device for performing channel coding based on polar coding may include a transceiver, a memory, and at least one processor connected to the transceiver and memory.

The memory may be configured to store instructions that, when executed by the at least one processor, cause the at least one processor to perform operations.

Figure 2:
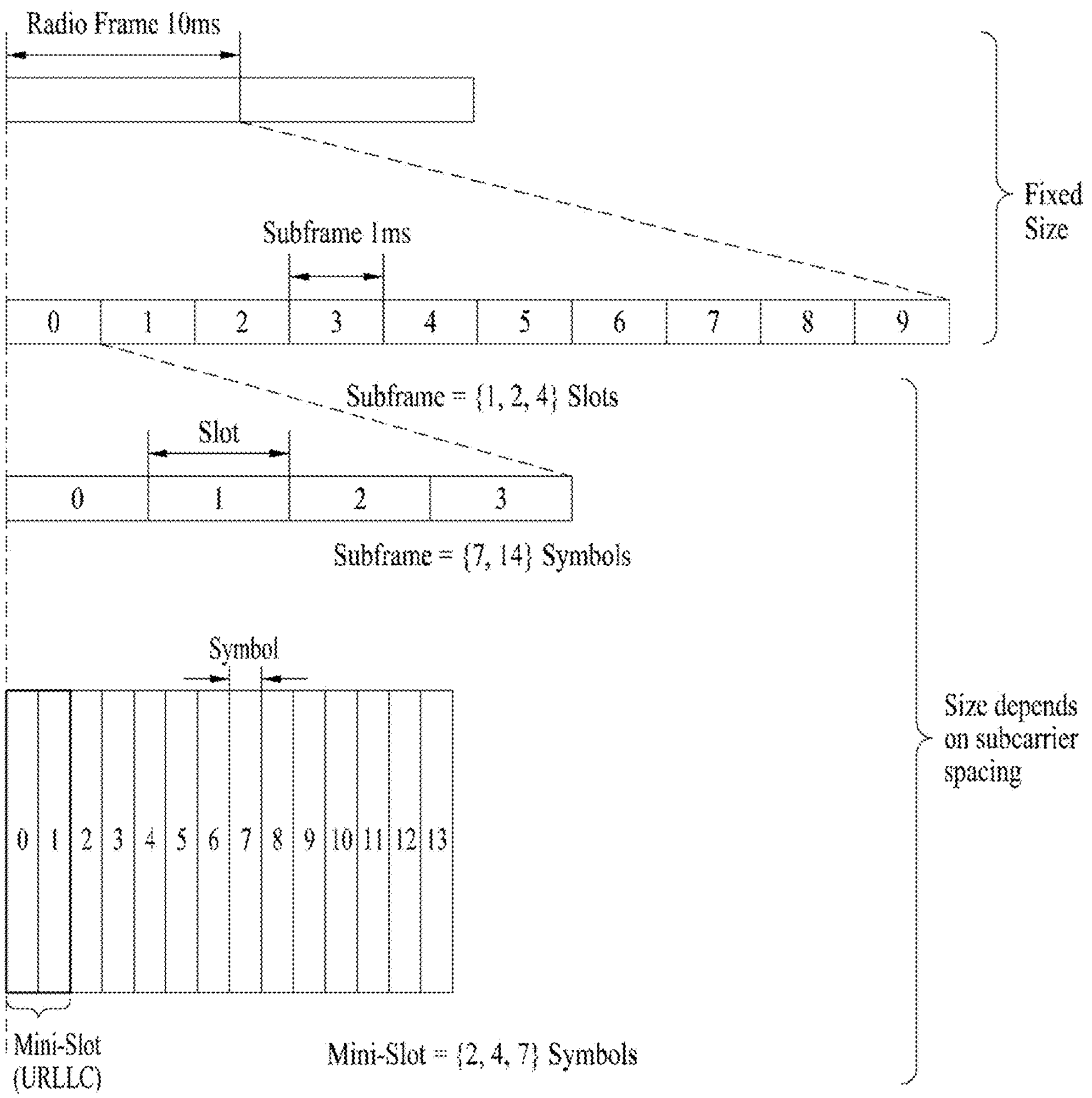
FIG. 2 is a diagram illustrating a frame structure of a new radio access technology (new RAT or NR).

FIG. 2 is a diagram illustrating a frame structure in NR.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of a frequency band. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1.

TABLE 1

| μ | $\Delta f = 2^{\mu} * 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., SCSs) to support various 5G services. For example, in an SCS of 15 kHz, the NR system supports a wide area in conventional cellular bands. In an SCS of 30/60 kHz, the NR system supports a dense urban environment, low latency, and wide carrier bandwidth. In an SCS of 60 kHz or above, the NR system supports a bandwidth higher than 24.25 GHz to overcome phase noise.

NR frequency bands are divided into two frequency ranges: frequency range 1 (FR1) and frequency range 2 (FR2). FR1 covers sub-6 GHz frequency bands, and FR2 covers frequency bands above 6 GHz, i.e., bands in the millimeter wavelength (mmWave).

Table 2 shows the definitions of the NR frequency ranges.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit, $T_s=1/(\Delta f_{max} \cdot N_f)$ where $\Delta f_{max}=480 \cdot 10^3$ and $N_f=4096$. DL and UL transmissions are organized into radio frames each having a duration of $T_f=(\Delta f_{max} N_f/100) \cdot T_s=10$ ms. Each radio frame includes 10 subframes each having a duration of $T_{sf}=(\Delta f_{max} N_f/1000) \cdot T_s=1$ ms. In this case, there may exist one set of frames for UL and one set of frames for DL. Further, transmission of UL frame #i from the UE should state a time $T_{TA}=N_{TA}T_s$ before the start of a corresponding DL frame. For a numerology μ, slots are numbered with $n_s^\mu \in \{0, \ldots, N_{subframe}^{slots,\mu}-1\}$ in an increasing order in a subframe, and with $n_{s,f}^\mu \in \{0, \ldots, N_{frame}^{slots,\mu}-1\}$ in an increasing order in a radio frame. One slot includes $N^\mu_{symb}$ consecutive OFDM symbols, and $N^\mu_{symb}$ depends on a used numerology and slot configuration. The start of a slot $n_s^\mu$ in a subframe is aligned in time with the start of an OFDM symbol $n_s^\mu N_{symb}^\mu$ in the same subframe. All UEs are not capable of simultaneous transmission and reception, which implies that all OFDM symbols of a DL slot or a UL slot may not be used. Table 3 lists the number $N_{symb}^{slot}$ of symbols per slot, the number $N_{slot}^{frame,\mu}$ of slots per frame, and the number $N_{slot}^{subframe,\mu}$ of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N^{slot}_{symb}$ | $N^{frame,\mu}_{slot}$ | $N^{subframe,\mu}_{slot}$ |
|---|---|---|---|
| 2 | 12 | 40 | 4 |

FIG. 2 illustrates an example with μ=2, that is, an SCS of 60 kHz, in which referring to Table 2 one subframe may include four slots. One subframe={1, 2, 4} slots in FIG. 2 which is exemplary, and the number of slot(s) which may be included in one subframe is defined as listed in Table 2.

Further, a mini-slot may include 2, 4 or 7 symbols, fewer symbols than 2, or more symbols than 7.

In the NR system, an antenna port, a resource grid, a resource element, a resource block, a carrier part, etc. may be considered as physical resources. Hereinafter, the physical resources considerable in the NR system will be described in detail.

First, an antenna port may be defined such that a channel conveying symbols on the antenna port is capable of being inferred from a channel conveying other symbols on the same antenna port. When the large-scale properties of a channel carrying symbols on one antenna port are inferred from a channel carrying symbols on another antenna port, the two antenna ports may be said to be in quasi co-located or quasi co-location (QC/QCL) relationship. The large-scale properties may include at least one of the following parameters: delay spread, Doppler spread, frequency shift, average received power, received timing, average delay, and spatial reception (Rx). The spatial Rx parameter refer to a spatial (Rx) channel characteristic parameter such as angle of arrival.

Figure 3:
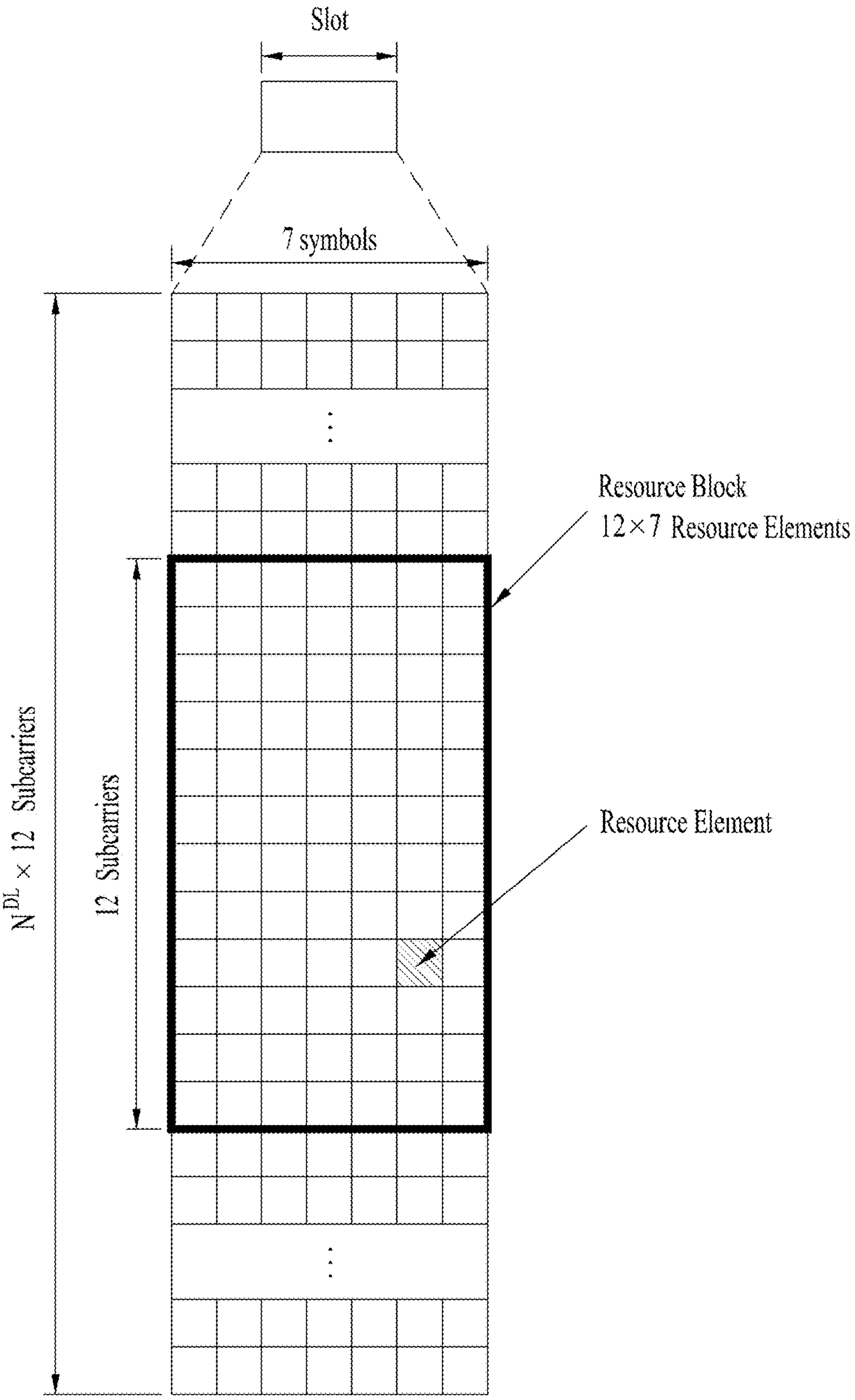
FIG. 3 illustrates a resource grid of NR.

FIG. 3 illustrates a resource grid in the NR system.

Figure 4:
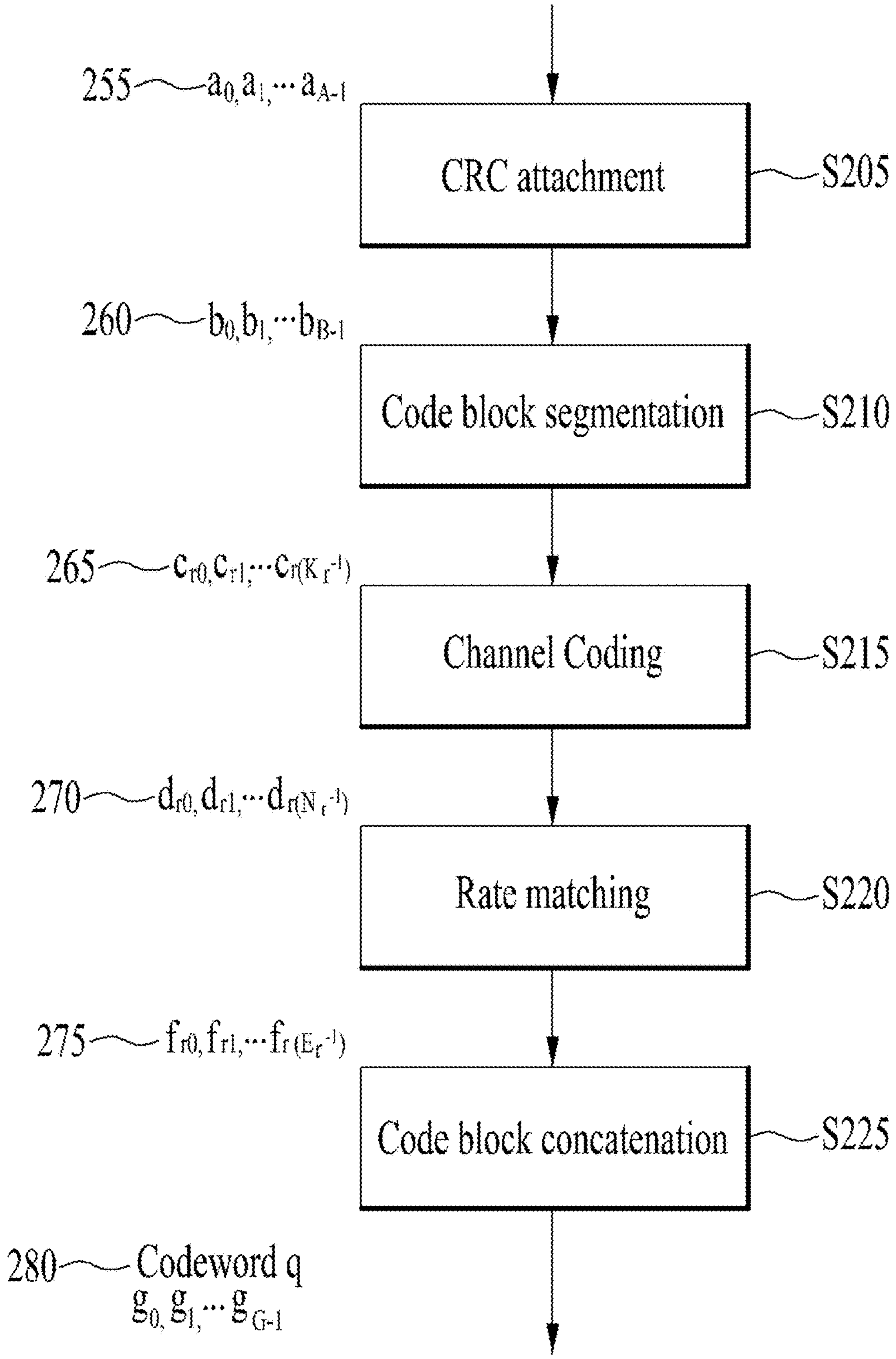
FIG. 4 is a diagram for explaining a channel coding method according to the present disclosure.

Referring to FIG. 3, a resource grid includes $N_{RB}^\mu N_{sc}^{RB}$ subcarriers in the time domain, and one subframe 14·2μ OFDM symbols, which is exemplary and thus should not be construed as limiting the disclosure. In the NR system, a transmitted signal is described by one or more resource grids including $N_{RB}^\mu N_{sc}^{RB}$ subcarriers and $2^\mu N_{symb}^{(\mu)}$ OFDM symbols, where $N_{RB}^\mu \leq N_{RB}^{max,\mu}$. $N_{RB}^{max,\mu}$ represents a maximum transmission bandwidth, which may be different for UL and DL as well as according to numerologies. In this case, one resource grid may be configured for each neurology μ and each antenna port p, as illustrated in FIG. 4. Each element of the resource grid for the numerology μ and the antenna port p is referred to as an RE, which is uniquely identified by an index pair $(k,\bar{l})$ where $k=0, \ldots, N_{RB}^\mu N_{sc}^{RB}-1$ is a frequency-domain index and $\bar{l}=0, \ldots, 2^\mu N_{symb}^{(\mu)}-1$ indicates the position of a symbol in a subframe. An RE in a slot is indicated by an index pair (k,l) where $l=0, \ldots, N_{symb}^\mu-1$. An RE $(k,\bar{l})$ for the numerology μ and the antenna port p corresponds to a complex value $a_{k,\bar{l}}^{(p,\mu)}$. When there is no risk of confusion or a specific antenna port or a numerology is not specified, the indexes p and μ may be dropped, and as a result, the complex value may be $a_{k,\bar{l}}^{(p)}$ or $a_{k,\bar{l}}$. In addition, an RB is defined as $N_{sc}^{RB}=12$ consecutive subcarriers in the frequency domain.

Considering that a UE may be incapable of supporting a wide bandwidth supported in the NR system, the UE may be configured to operate in a part of the frequency BW of a cell (hereinafter referred to as a bandwidth part (BWP)).

In the NR system, resource blocks may be divided into physical resource blocks defined within the BWP and common resource blocks numbered from 0 upward in the frequency domain for an SCS configuration μ.

Point A is obtained as follows.

For a PCell downlink, offsetToPointA represents the frequency offset between point A and the lowest subcarrier of the lowest resource block overlapping with an SS/PBCH block used by the UE for initial cell selection, which is expressed in units of resource blocks on the assumption of an SCS of 15 kHz for FR1 and an SCS of 60 kHz for FR2.

For other cases, absoluteFrequencyPointA represents the frequency location of point A expressed as in the absolute radio-frequency channel number (ARFCN).

The center of subcarrier 0 of common resource block 0 for the SCS configuration μ coincides with point A, which act as the reference point for resource grids. The relationship between a common resource block number $n^\mu_{CRB}$ in the frequency domain and a resource elements (k,l) for the SCS configuration μ is given by Equation 1.

$$n^{\mu}_{CRB} = \left\lfloor \frac{k}{N^{RB}_{sc}} \right\rfloor \quad \text{[Equation 1]}$$

In Equation 1, k is defined relative to point A such that k=0 corresponds to a subcarrier around point A. Physical resource blocks are numbered from 0 to $N^{size}_{BWP,i-1}$ within the BWP, where i is the number of the BWP. The relationship between a physical resource block $n_{PRB}$ and a common resource block $n_{CRB}$ in BWP i is given by Equation 2.

$$n_{CRB}=n_{PRB}+N_{BWP,i}^{start} \quad \text{[Equation 2]}$$

In Equation 2, $N^{start}_{BWP,i}$ is a common resource block where the BWP starts relative to common resource block 0.

FIG. 4 is a diagram for explaining a channel coding method according to the present disclosure.

Data subject to channel coding is referred to as a transport block. Typically, depending on the performance of channel coding, the transport block is divided into code blocks, each of which has a size less than or equal to a predetermined value. For example, in turbo coding of 3GPP TS 36.212, the code block may have a maximum size of 6144 bits. In low density parity check (LDPC) coding of 3GPP TS 38.212, the code block may have a maximum size of 8448 bits (in base graph 1) or 3840 bits (in base graph 2). In polar coding, the code block may have a minimum size of 32 bits and a maximum size of 8192 bits. The code block may be subdivided into sub-blocks. In polar coding methods according to the present disclosure, an input bit sequence (265) ($c_{r0}$, $c_{r1}$, . . . , $cr_{(Kr-1)}$) is interleaved, the interleaved input bit sequence (not shown in the drawing) ($c'_{r0}$, $c'_{r1}$, . . . , $c'_{r(Kr-1)}$) may be encoded based on polar codes. The encoded bit sequence (270) ($d_{r0}$, $d_{r1}$, . . . , $d_{r(Nr-1)}$) may be rate matched. The rate matching of the encoded bit sequence (270) may include: subdividing the encoded bit sequence into sub-blocks; interleaving each of the sub-blocks; performing bit selection for each of the interleaved sub-blocks; and interleaving coded bits again. The bit selection for each of the interleaved sub-blocks may include repeating, puncturing, or shortening some bits.

The channel coding method according to the present disclosure may include attaching a cyclic redundancy check (CRC) code to a transport block (S205); dividing the transport block into code blocks (S210); encoding the divided code blocks (S215); perform rate matching of the encoded code blocks (S220); and concatenating the rate-matched code blocks (S225).

In step S205, party bits with a length of L are attached to the transport block (255) ($a_0$, . . . , $a_{A-1}$). The length L may be any one of 6, 11, 16, and 24. Typically, cyclic generator polynomials are used to generate party bits. In addition, scrambling operation may be applied to output bits (260) ($b_0$, . . . , $b_{B-1}$), which depend on the CRC attachment, with a radio network temporary identifier (RNTI). Exclusive OR (EOR) operation may be applied between a scrambling sequence and corresponding bits based on the scrambling operation.

The output bits (260) ($b_0$, . . . , $b_{B-1}$) depending on the CRC attachment may be segmented into code blocks (265) according to code block sizes. This is called code block segmentation. The code block sizes are determined by channel coding methods. A code block size suitable for each channel coding method may be determined theoretically or experimentally. For example, the segmented code blocks (265) ($c_{r0}$, . . . , $c_{r(Kr+1)}$) may be encoded as encoded bits (270) ($d_{r0}$, . . . , $d_{r(Nr-1)}$), respectively.

The encoded bits (270) ($d_{r0}$, . . . , $d_{r(Nr-1)}$) are generated by applying channel coding to the code blocks (265) ($c_{r0}$, . . . , $c_{r(Kr-1)}$) (S215). The generated encoded bits (270) may be rate-matched by shortening and puncturing. Alternatively, the encoded bits (270) may be rate-matched by sub-block interleaving, bit selection, and/or interleaving. That is, the encoded bits (270) ($d_{r0}$, . . . , $d_{r(Nr-1)}$) are converted into rate-matched bits (275) ($f_{r0}$, . . . , $f_{r(gr+1)}$) (S220). Typically, interleaving may refer to a process for changing a sequence of bits and reduce the occurrence of errors. The interleaving is designed in consideration of efficient de-interleaving.

Sub-block interleaving may mean a process for dividing a code block into a plurality of sub-blocks (e.g., 32 sub-blocks) and allocating bits based on the sub-block interleaving.

The bit selection may mean a process for increasing a bit sequence by repeating bits based on the number of bits to be rate-matched or decreasing the bit sequence based on shortening, puncturing, etc. The interleaving may mean a process for interleaving encoded bits after the bit selection.

In another example of the present disclosure, the rate matching may include the bit selection and interleaving. The sub-block interleaving is not mandatory.

After interleaving the encoded bits, code block concatenation is applied to concatenate the code blocks (275) so that a codeword (285) ($g_0$, . . . , $g_{G-1}$) may be generated (S225). The generated codeword 280 may be equivalent to one transport block.

Figure 5:
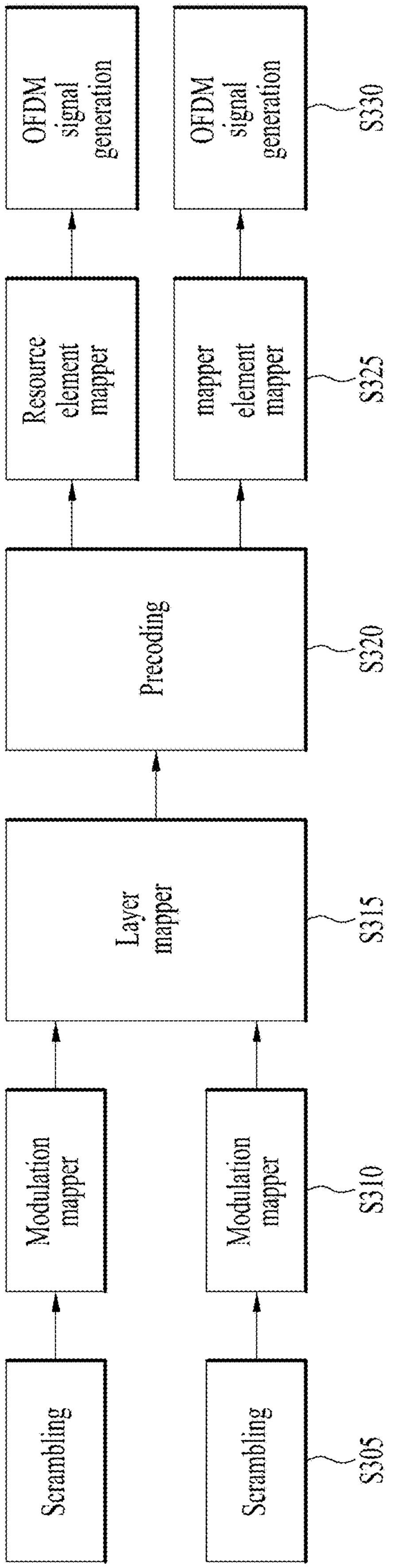
FIGS. 5 and 6 are diagrams for explaining a modulation method according to the present disclosure.
Figure 6:
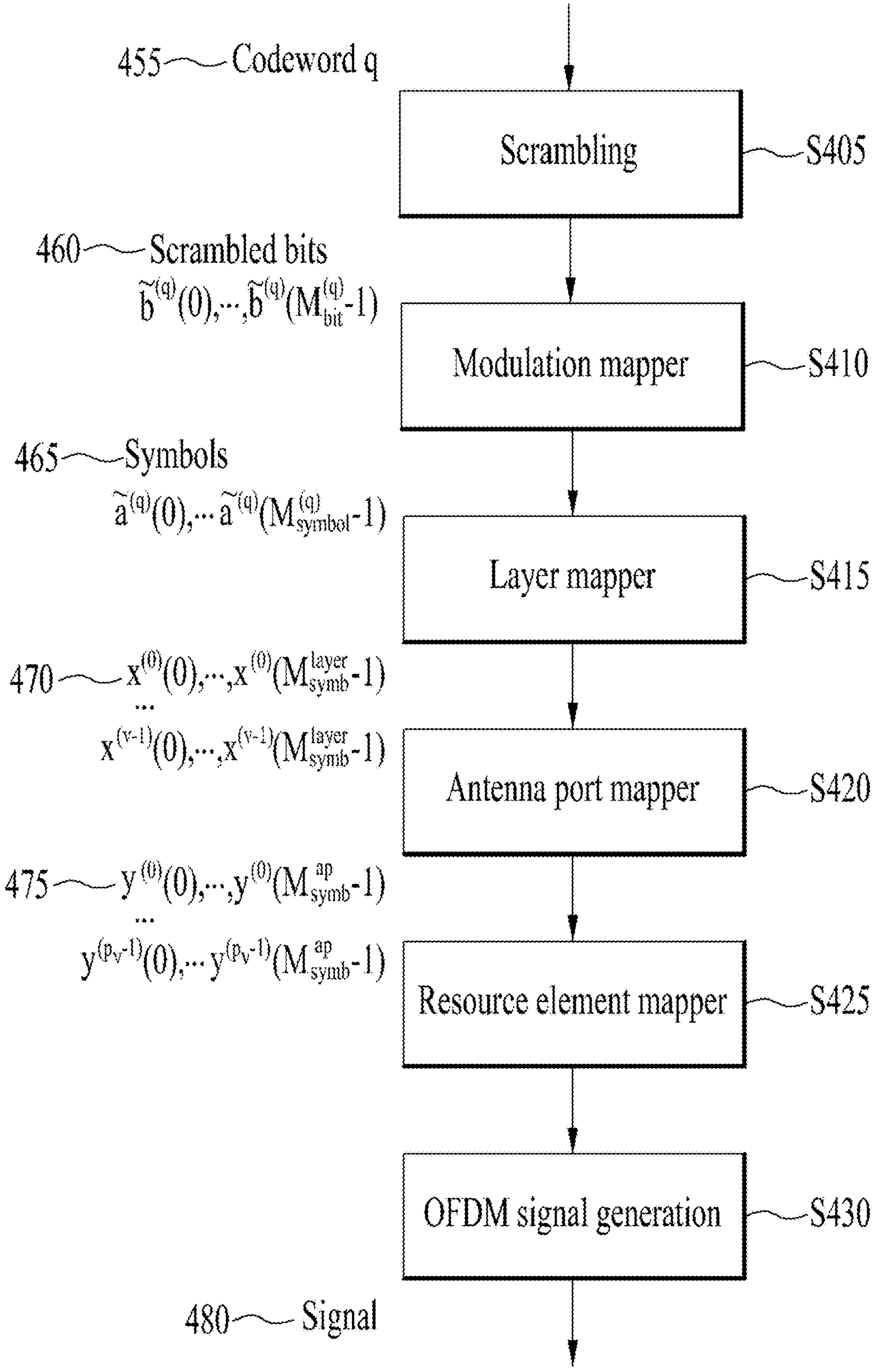

FIGS. 5 and 6 are diagrams for explaining a modulation method according to the present disclosure.

Referring to FIGS. 5 and 6, one or more codewords are input and scrambled (S305 and S405). For example, scrambling may be performed based on EOR operation between an input bit sequence and a predetermined bit sequence. The scrambled bits are modulated (S310 and S410), and the modulated symbols are mapped to layers (S315 and S415). The symbols mapped to the layers are precoded for antenna port mapping. The precoded symbols are mapped to resource elements (S325 and S425). The mapped symbols are generated as OFDM signals (S330 and S430) and transmitted through antennas.

Figure 7:
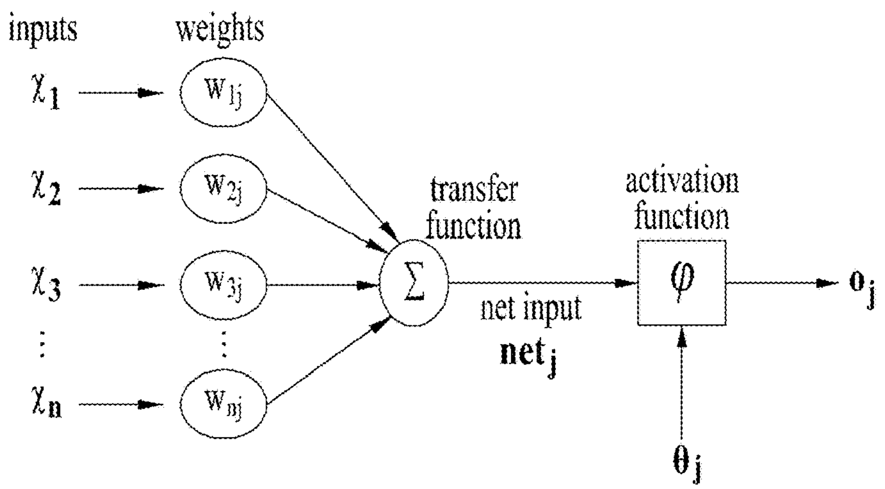
FIG. 7 is a diagram for explaining a backpropagation method in a neural network.

FIG. 7 is a diagram for explaining a backpropagation method in a neural network.

To update the weights of a neural network, backpropagation may be performed.

In a backpropagation model, the error function is defined by E=L(y, t), and the weight is applied to an output $o_k$ to obtain an input (input, $net_j$) of the neural network.

If a neuron is in the first layer after the input layer, $o_k$ of the input layer may simply be an input to the network, $x_k$.

Referring to FIG. 7, $o_j$ may be defined as shown in Equation 5.

$$o_j = \varphi(\text{net}_j) = \varphi\left(\sum_{k=1}^{n} w_{kj} o_k\right) \quad \text{[Equation 3]}$$

Figure 8:
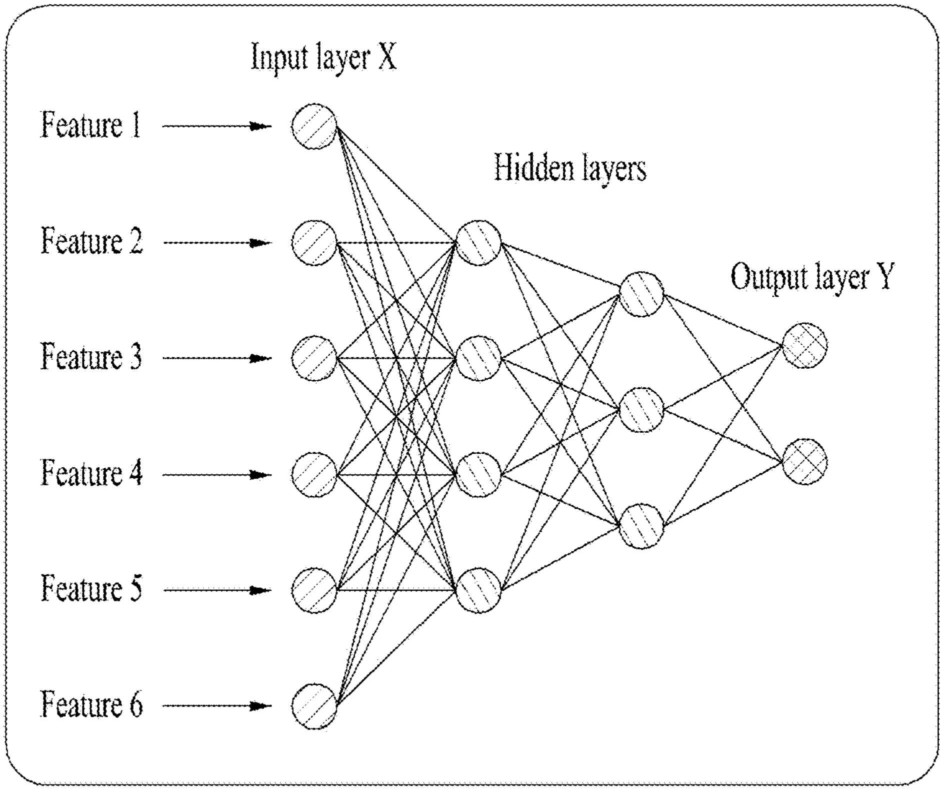
FIG. 8 is an exemplary diagram illustrating a prediction method of an artificial neural network (ANN).

Referring to FIG. 8, the error function E may satisfy Equation 6.

$$\frac{\partial E}{\partial w_{ij}} = \frac{\partial E}{\partial o_j}\frac{\partial o_j}{\partial w_{ij}} = \frac{\partial E}{\partial o_j}\frac{\partial o_j}{\partial \text{net}_j}\frac{\partial \text{net}_j}{\partial w_{ij}} \quad \text{[Equation 4]}$$

-continued $$\frac{\partial \mathrm{net}_j}{\partial w_{ij}} = \frac{\partial}{\partial w_{ij}}\left(\sum_{k=1}^{n} w_{kj} o_k\right) = \frac{\partial}{\partial w_{ij}}(w_{ij} o_i) = o_i$$

$$\frac{\partial o_j}{\partial \mathrm{net}_j} = \frac{\partial \varphi(\mathrm{net}_j)}{\partial \mathrm{net}_j}$$

$\frac{\partial E}{\partial o_j}$: $E$ as a function with the inputs being all neurons, $L = \{u, v, w, \ldots\}$ receiving from input neurons $j$ $\rightarrow$ if $o_j$ is an output neuron, $$\frac{\partial E}{\partial o_j} = \frac{\partial E}{\partial y} = \frac{\partial L(y, t)}{\partial y}$$

$$\rightarrow \frac{\partial E}{\partial o_j} = \sum_{l \in L}\left(\frac{\partial E}{\partial \mathrm{net}_l}\frac{\partial \mathrm{net}_l}{\partial o_j}\right) = \sum_{l \in L}\left(\frac{\partial E}{\partial o_l}\frac{\partial o_l}{\partial \mathrm{net}_l}\frac{\partial \mathrm{net}_l}{\partial o_j}\right) = \sum_{l \in L}\left(\frac{\partial E}{\partial o_l}\frac{\partial o_l}{\partial \mathrm{net}_l} w_{jl}\right)$$

$$\rightarrow \frac{\partial E}{\partial w_{ij}} = \frac{\partial E}{\partial o_j}\frac{\partial o_j}{\partial \mathrm{net}_j} o_i = \delta_j o_i$$

1. Machine Learning/Deep Learning

FIG. 8 illustrates an exemplary diagram of a deep learning configuration to which an embodiment of the present disclosure is applicable.

For machine learning/deep learning, elements related to learning are as follows.

- Algorithm used (e.g., a deep neural network (DNN), a convolutional neural network (CNN), a recurrent neural network (RNN), etc.)
- Number of inputs/outputs
- Weight/bias
- Number of layers and number of nodes per layer
- Activation function to be applied per layer (e.g. sigmoid, rectified linear unit (ReLU), etc.)

Machine learning/deep learning, which is a method of implementing AI, aims at establishing a system that is capable of predicting a result even with respect to any input by training reactions to various inputs in the direction of minimizing a loss function which is the difference between an actual value and a predicted value.

2. AI-Applied Receiver (AI-Applied Physical Receiver)

Figure 9A:
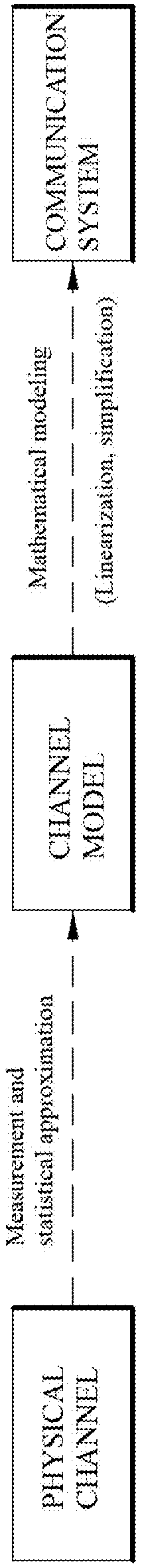
FIG. 9A is an exemplary diagram applied to a physical receiver according to the present disclosure.

FIG. 9A is an exemplary diagram applied to a physical receiver according to the present disclosure.

The physical receiver disclosed in the present disclosure represents a receiver related to the reception performance of a UE. As illustrated in FIG. 9A, an existing physical receiver is obtained by applying, to a receiver of the UE, a mathematical transmission/reception model which is designed in an optimized manner by being derived based on a physical channel approximated to a statistical model.

An AI-applied physical receiver is a receiver that applies AI to a receiving side of the UE when deriving the transmission/reception model of the UE.

Figure 9B:
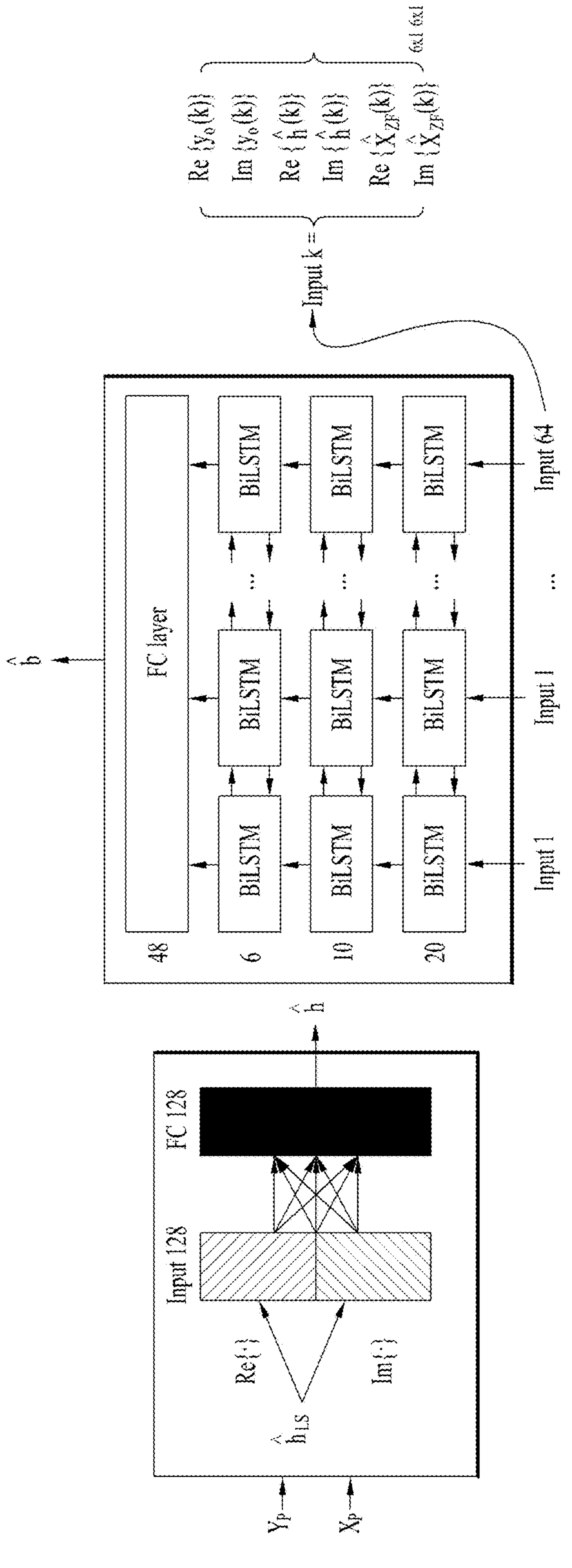
FIG. 9B is an exemplary diagram utilizing machine learning/deep learning for channel estimation and data restoration of an orthogonal frequency-division multiplexing (OFDM) system to which the present disclosure is applicable.
Figure 10:
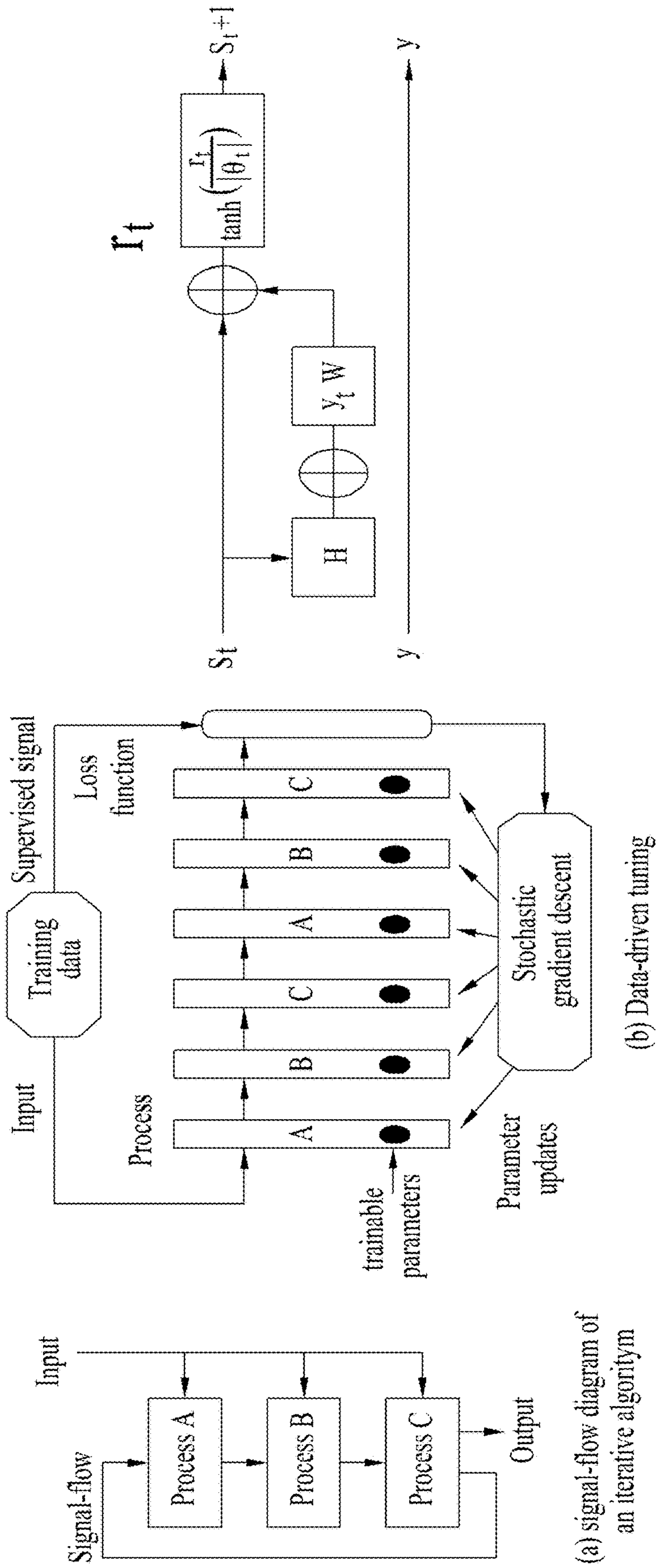
FIG. 10 is an exemplary diagram of an algorithm and a parameter tuning procedure to which the present disclosure is applicable.

FIG. 9B is an exemplary diagram utilizing machine learning/deep learning for channel estimation and data restoration of an OFDM system to which the present disclosure is applicable. FIG. 10 is an exemplary diagram of an algorithm and a parameter tuning procedure to which the present disclosure is applicable.

Using machine learning/deep learning for channel estimation and data restoration of the OFDM system exhibits similar performance to a conventional scheme in terms of signal-to-noise ratio (SNR), computational complexity, and memory usage. A conventionally proposed iterative algorithm may be changed to a deep learning network or a trainable network of multiple layers through deep unfolding, and parameters of the deep learning or trainable network may be optimized through learning. In this way, study is underway to improve performance by applying AI to the existing physical receiver in the form of improving performance and reducing the amount of calculation relative to the conventional scheme.

3. 6G-Band Above 6 GHz and Reduction of Cell Size

In sixth generation (6G), since higher data rates and spectral and energy efficiency (SEE) are required anytime and anywhere, it is necessary to use a high-frequency band (terahertz, THz) exceeding 6 GHz. To use the THz frequency, a 6G cell should be reduced in size from a small cell to a "tiny cell" with a radius of only a few tens of meters. This results in a much denser placement of the tiny cell and the need for a new high-frequency mobility management technique.

4. Operations of Existing Physical Receiver and AI-Applied Physical Receiver

Research on methods and procedures for applying various techniques to apply AI to a physical layer of wireless communication is also in progress. The UE receives a trained model from a BS, and the UE or the BS triggers operation. The UE performs switching from the "AI-applied physical receiver" (hereinafter, an "AI receiver") to an "existing physical receiver" based on an offset given by the BS.

However, in the case in which each BS has each AI receiver, an RRC state of the UE varies when the UE selects and changes a cell, and a detailed procedure for applying the AI receiver according to a corresponding situation has not been proposed.

In addition, in 6G, since the BS will operate the "tiny cell", the UE will more frequently undergo cell reselection and handover in the tiny cell than in an existing cell, which means that the BS is frequently changed. If operation of an existing AI receiver is applied to BSs, since each BS has an AI receiver learning model, the UE should receive a new AI receiver learning model whenever the BS is changed and then receive information as to whether operation is triggered in the changed BS. In this case, since delay time required for switching occurs, stable data transmission and reception may be disturbed.

5. Proposed Technology (1) Message Type

The message type is categorized into a "static message" used between the BS and the UE after synchronization and an "operation message" which is changeable during data transmission and reception.

1) Static Message

BS Side:

(i) Whether or not the UE supports AI for specific RAT (ii) AI supportable list (MIMO receiver, channel decoding, modulation-related, end-to-end, etc.)

Ue Side:

(i) Whether or not AI is supportable (ii) AI supportable list (MIMO receiver, channel decoding, modulation-related, end-to-end, etc.)

(iii) AI computation capability

2) Operation Message

Bs Side:

(i) Information about a model to which an AI receiver is applicable (trained model architecture and/or model weight)

(ii) Reception related parameters used for learning (iii) Timers related to application of the AI receiver An AI receiver evaluation timer—a timer indicating whether the performance of the receiver is degraded and/or indicating a measurement cycle A zone maintenance timer—a timer for confirming frequent zone movement during cell reselection and handover (2) System Operation Procedure BSs form a zone based on measurement of a channel environment in which the BSs are installed and the BSs forming the zone learn one AI receiver model.

If the UE supports an AI receiver, the UE performs a cell selection procedure and then receives information related to AI receivers.

The UE stores the information related to the AI receivers. The UE maintains the information related to one, two, or more AI receivers according to capability.

Upon receiving a triggering event from the BS, the UE performs data transmission and reception using an AI receiver.

If the UE performs a cell reselection or handover procedure, the UE selects a receiver through comparison between previously stored information related to an AI receiver and newly received information related to an AI receiver and then performs data transmission and reception.

The BSs forming the zone periodically share data to perform updating through re-learning of an AI receiver model.

If re-learning of the AI receiver model is completed, the BS informs the UE of a related result (using a new AI receiver model or an existing AI receiver model).

The UE confirms the result of re-learning of the AI receiver model in a received message and performs data transmission and reception by maintaining the existing model or using the new AI receiver model.

In preparation for the case in which the UE frequently moves between zones, the UE uses an AI receiver list and manages the list according to criteria.

5-1. Initial BS Zone Configuration

Figure 11:
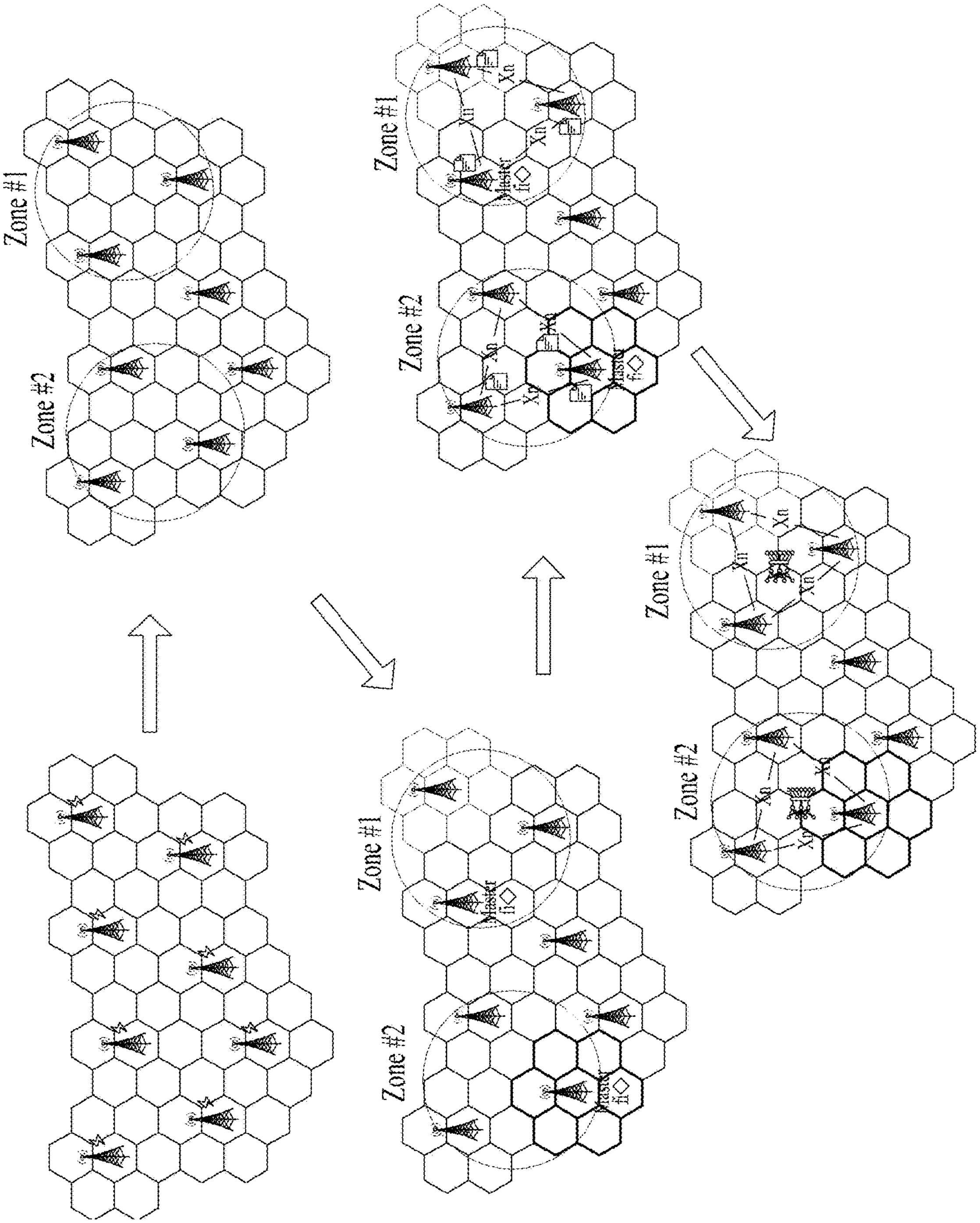
FIG. 11 is an exemplary diagram of a procedure of configuring an initial BS zone to which the present disclosure is applicable.

FIG. 11 is an exemplary diagram of a procedure of configuring an initial BS zone to which the present disclosure is applicable. The procedure of configuring the initial BS zone is as follows:

Step 1: BSs having similar channel environments are configured as one zone.

Step 2: One master BS is selected between the BSs configured as the zone. The master BS serves to generate a final model by combining models generated by the BSs.

Step 3: The BSs configured as the zone transmit training data through an interface between the BSs (an Xn interface). The BSs generate learned models using the transmitted data. This serves to prevent overfitting that may occur while machine learning/deep learning is conducted because many pieces of data may be secured without using only data collected by the BSs.

Step 4: The master BS collects models learned by the respective BSs and finally combines the models, thereby generating one AI receiver model per zone. Then, the master BS transmits the AI receiver model to the remaining BSs.

Hereinbelow, a method of generating the learned models by the BSs configured as the zone in Step 4 will be described.

5-1-1. Ensemble Learning—Bagging

Ensemble learning refers to a method of training multiple models in machine learning and estimating a better value than one model using the estimation results of the trained models. As can be inferred therefrom, ensemble learning handles problems by training and then combining multiple models rather than only one model. In particular, ensemble learning is effectively used when desired performance is incapable of being obtained only with one model. Generalization performance may be improved by combining multiple models that are individually trained. A representative example of ensemble learning is a bagging method. Bagging is an abbreviation of bootstrap aggregating. Bagging refers to a method of generating classifiers for respective samples by repeatedly extracting samples of the same size several times with simple probability from a training data set and synthesizing the results of the generated classifiers to make a decision.

Figure 12:
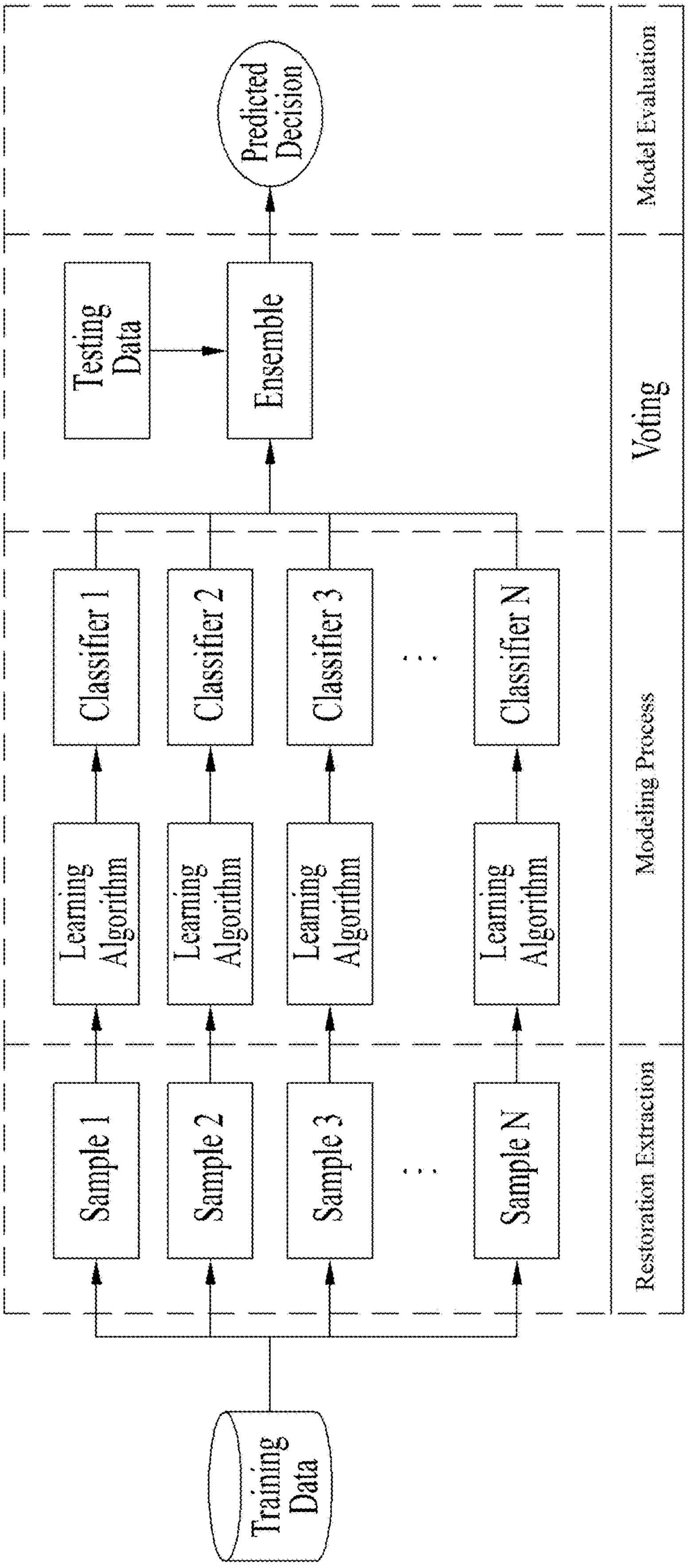
FIG. 12 is an exemplary diagram of ensemble learning to which an embodiment of the present disclosure is applicable.

FIG. 12 is an exemplary diagram of ensemble learning to which an embodiment of the present disclosure is applicable.

Bagging is a method of generating N sub datasets from training data to generate classifiers by applying learning algorithms to respective sub datasets. Model evaluation is performed using testing data, which has been separately classified in advance, with respect to the generated classifiers.

A method in which BSs configured as a zone generate learned models may be performed as follows:

(1) Respective BSs generate learned models through machine learning.

(2) The learned models are shared between the BSs configured as a zone. In this case, the BSs share "a" pieces of data used for learning and testing. For example, if there are three BSs belonging to a zone, the total number of data possessed by the BSs is 3a.

(3) Each BS separates the collected data into training data and testing data and then selects n random subsets of the training data to train each model. In this case, when selecting the n random subsets, duplicate selection is possible.

(4) The BS performs final prediction by combining prediction models trained in the process of (3).

Figure 13:
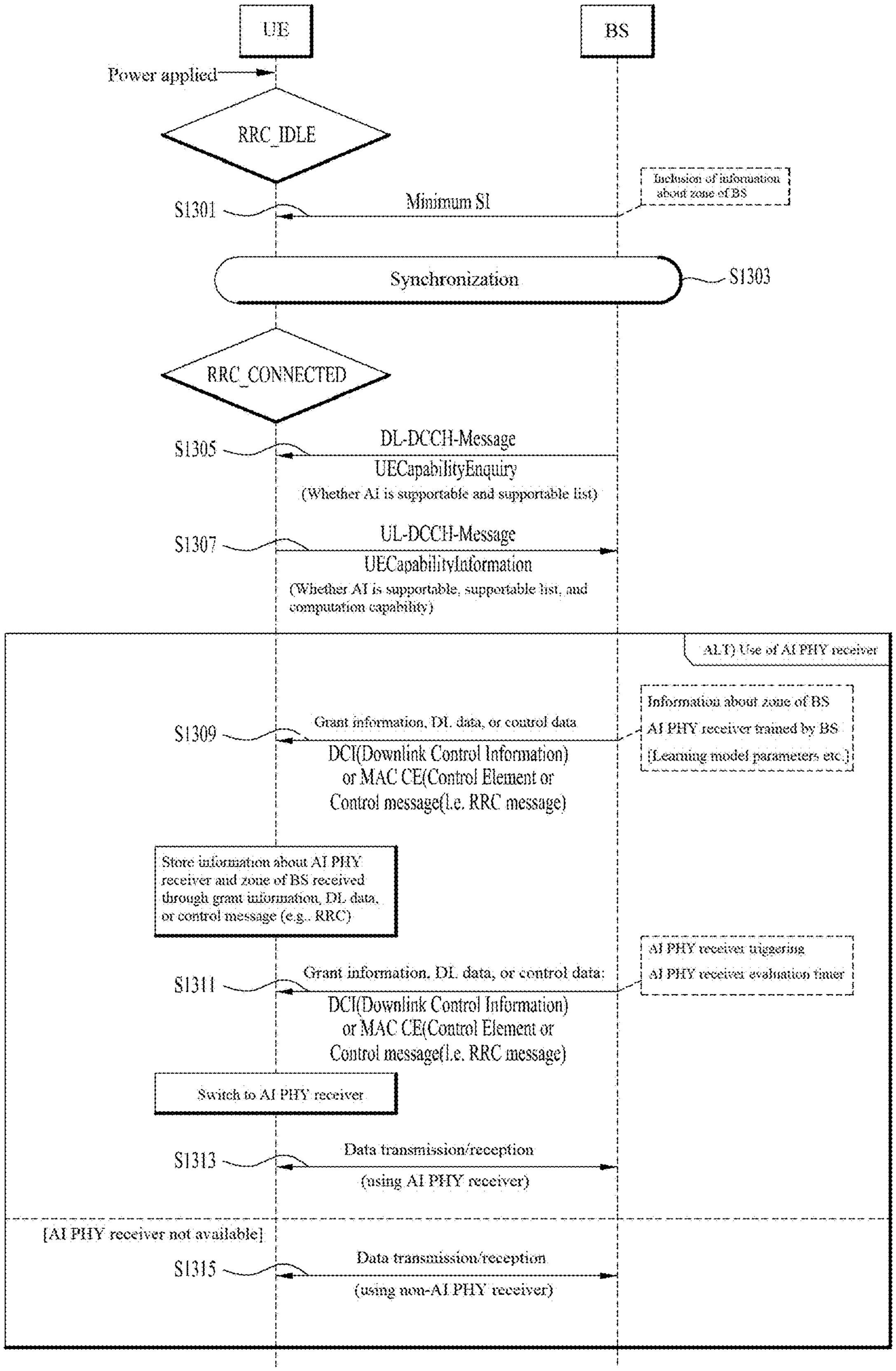
FIG. 13 is an exemplary diagram illustrating a procedure related to the use of an AI receiver between a UE and a BS related to cell selection according to the present disclosure.

5-2. Procedures Related to Use of AI Receiver Between UE and BS Related to Cell Selection FIG. 13 is an exemplary diagram illustrating a procedure related to the use of an AI receiver between a UE and a BS related to cell selection according to the present disclosure.

The procedure is started in a state in which a zone is formed between BSs and each zone has one AI receiver.

The UE enters an RRC_IDLE state after power is applied thereto. The UE receives system information (SI) (S1301) and then the UE and the BS perform synchronization (S1303). In a current situation, since the UE has no information about an AI receiver, synchronization is performed using a non-AI receiver.

After synchronization, the UE transitions to an RRC_CONNECTED state. Then, the BS requests the UE to transmit information about whether the UE supports AI and a supportable list (S1305), and the UE transmits the corresponding information to the BS (S1307).

Only when the BS that has analyzed the information received from the UE determines that the AI receiver is available, the BS transmits information about a zone of a current BS, the AI receiver, and a period of an AI receiver evaluation timer to the UE (S1309 and S1311). In this case, the related information may be transmitted by being included in DCI in grant information, in DL data (e.g., MAC CE), or in a control message.

The UE stores the received information related to the AI receiver. Upon receiving AI receiver application triggering from the BS, the UE switches to the AI receiver and then performs data transmission/reception (S1313).

Upon failing to receive the information about the AI receiver from the BS, the UE performs data transmission/reception using a non-AI receiver (S1315).

Figure 14:
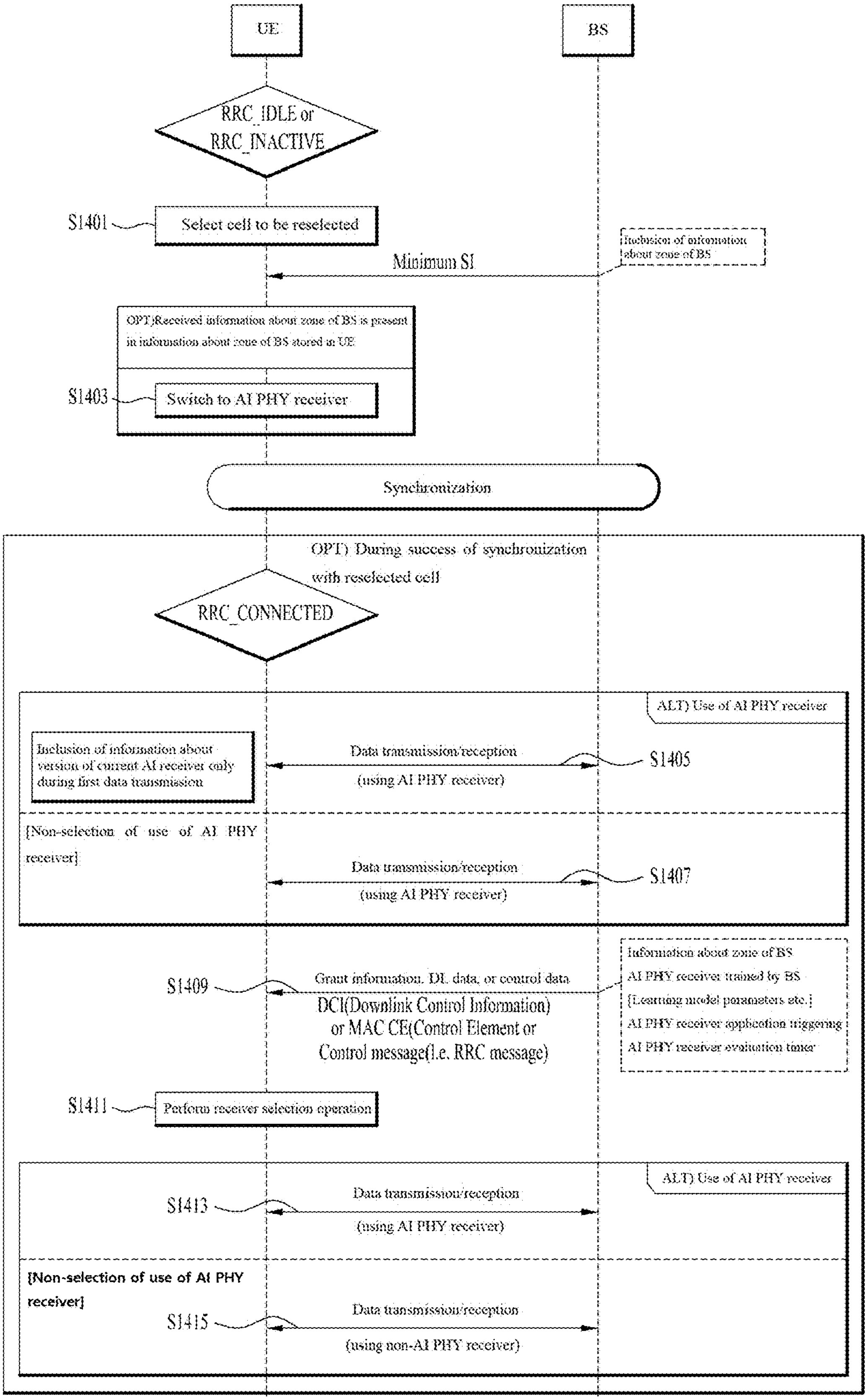
FIG. 14 is an exemplary diagram illustrating a method related to the use of an AI receiver between a UE and a BS related to cell reselection according to the present disclosure.

5-3. Procedures Related to Use of AI Receiver Between UE and BS Related to Cell Reselection FIG. 14 is an exemplary diagram illustrating a method related to the use of an AI receiver between a UE and a BS related to cell reselection according to the present disclosure.

In an RRC_IDLE or RRC_INACTIVE state, the UE measures a signal of a serving cell on which the UE is currently camping to obtain a signal received level and then determines whether to select another cell. If the measured signal level is lower than a given threshold, the UE triggers cell reselection for selecting another cell and selects one cell according to a cell reselection criterion (S1401).

Since the UE has switched to the RRC_IDLE or RRC_INACTIVE state while using an AI receiver in an RRC_CONNECTED state (S1403), the UE already has contained information about an existing AI receiver and a zone of a BS.

Figure 15:
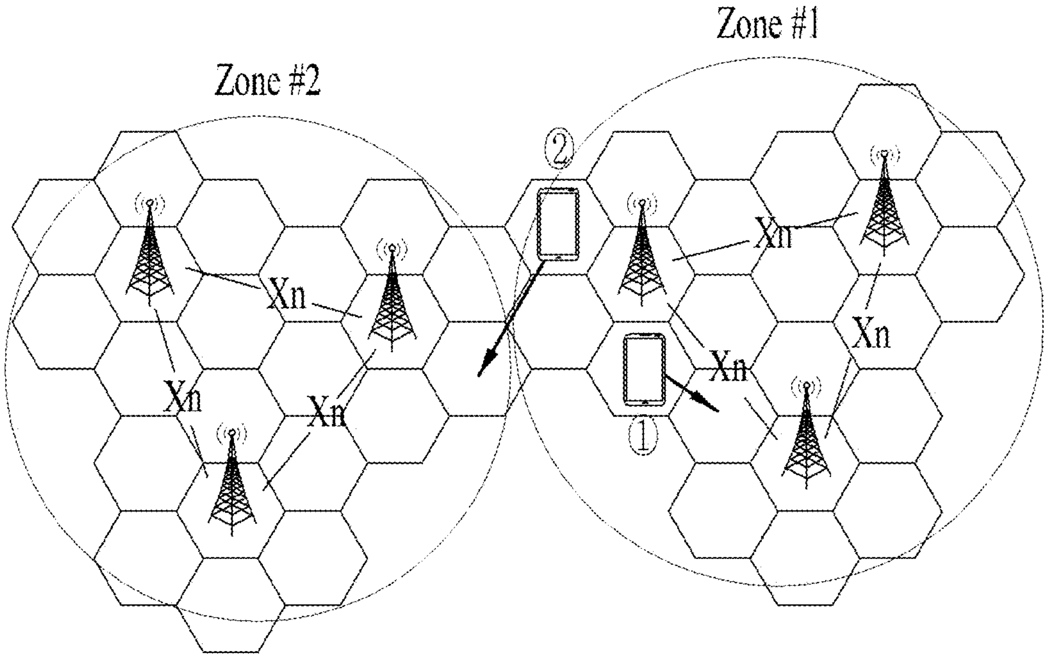
FIG. 15 is an exemplary diagram of cell reselection of a UE to which an embodiment of the present disclosure is applicable.

FIG. 15 is an exemplary diagram of cell reselection of a UE to which an embodiment of the present disclosure is applicable.

In this case, when cell reselection corresponding to BSs belonging to the same zone occurs (in the case of UE 1 in FIG. 15), the UE may be aware that there is stored zone information by acquiring zone information through SI. Therefore, in this case, the UE switches to the AI receiver to perform synchronization (S1405).

If cell reselection corresponding to BSs belonging to another zone occurs (in the case of UE 2 in FIG. 15), when the UE has no information about the corresponding zone, the UE performs synchronization using a non-AI receiver until information about the AI receiver is received from the BS (S1407).

After synchronization is successful, the UE transmits information about a version of a current AI receiver to the BS during first data transmission only when the UE is using the AI receiver (S1405).

The BS transmits information necessary to apply the AI receiver of the UE to the UE (S1409).

The UE performs a receiver selection operation using the information received from the BS and previously stored information (S1411) and performs data transmission/reception using a selected receiver (S1413 and S1415).

5-4. Procedure Between UE and BS to Use AI Receiver During Handover

Figure 16:
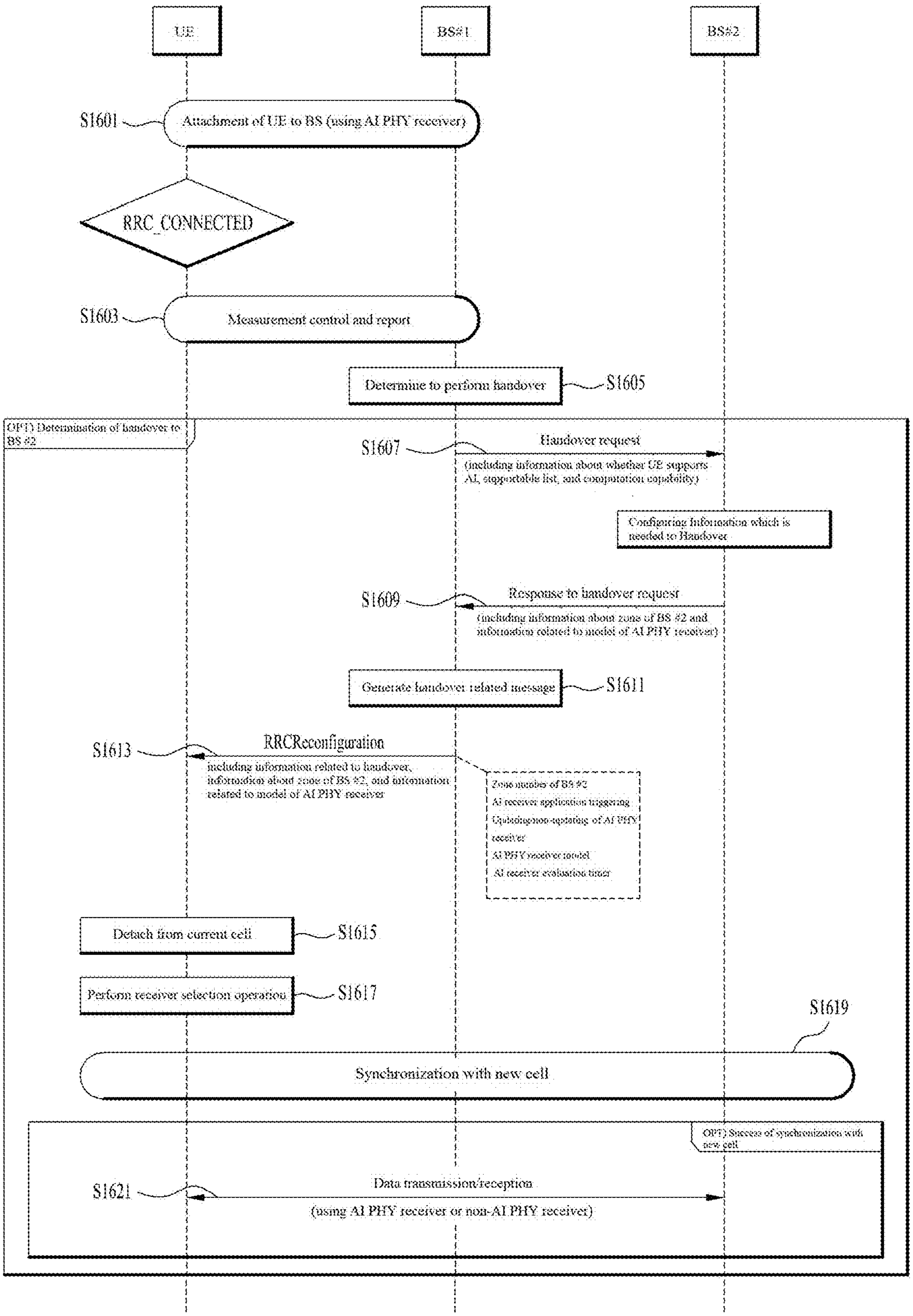
FIG. 16 is an exemplary diagram illustrating a procedure between a UE and a BS for using an AI receiver during handover according to the present disclosure.

FIG. 16 is an exemplary diagram illustrating a procedure between a UE and a BS for using an AI receiver during handover according to the present disclosure.

BS #1 receives measurement-related information from the UE (S1603), makes a decision for handover to BS #2 based on determination about the information (S1605), and then requests BS #2 to perform handover (S1607). Upon request, BS #1 transmits information for configuring an AI receiver of the UE.

Upon receiving a message from BS #1, BS #2 transmits information necessary for handover of the UE, information about a zone of BS #2 to apply the AI receiver, and information about a trained AI receiver to BS #1 as a response to the handover request (S1609).

BS #1 generates a handover related message RRCReconfiguration based on the information received from BS #2 and transmits the handover related message to the UE (S1613).

When generating the message, if BS #1 and BS #2 are formed in the same zone, BS #1 confirms a version of an AI receiver model that has recently transmitted to the UE. If it is confirmed that an AI receiver has been updated, information about an AI receiver model of BS #2 is included in the message and, otherwise, the information about the receiver model of BS #2 is not included in the message. If the BS #1 and the BS #2 belong to different zones, the AI receiver model of the BS #2 is included in the message.

Upon receiving the RRCReconfiguration message, the UE is detached from a current cell (S1615) and then performs a receiver selection operation (S1617). In this case, if the AI receiver is selected to be used, the UE may use the corresponding receiver in a process after new cell synchronization, thereby reducing delay time for applying the AI receiver model.

After succeeding in synchronization with a new cell, the UE hears BSs to receive information related to the AI receiver while performing data transmission and reception (S1619 and S1621).

Figure 17:
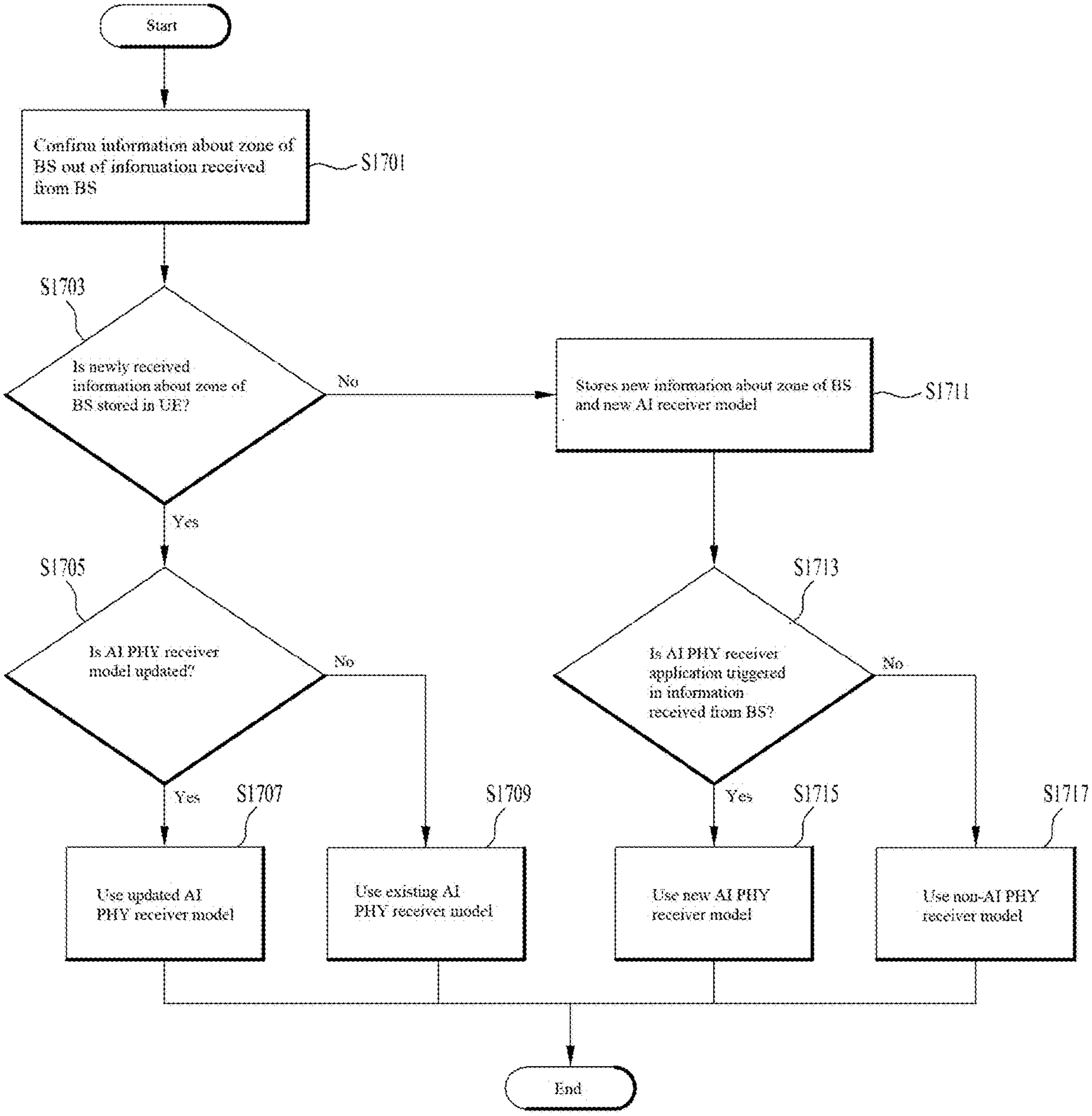
FIG. 17 is an exemplary diagram illustrating a procedure related to use of an AI receiver during cell reselection or handover according to the present disclosure.

5-5. Procedure Related to Use of AI Receiver During Cell Reselection or Handover FIG. 17 is an exemplary diagram illustrating a procedure related to use of an AI receiver during cell reselection or handover according to the present disclosure.

Since the UE is in a state in which the AI receiver is stored to improve data transmission and reception, if newly received information about a zone of a BS is present in information about the zone of the BS which has been stored in the UE (S1703), the UE determines whether an AI receiver model is updated (S1705) and uses an existing stored model (S1707) or the updated model (S1709).

If the received information about the zone of the BS is not present in the information about the zone of the BS stored in the UE, the UE stores the new information about the zone of the BS and a new AI receiver model (S1711). To use the stored AI receiver model, the BS should trigger AI receiver application. If corresponding triggering is included in information received from a current BS (S1713), the UE immediately uses the new AI receiver model (S1715) and, if not, the UE determines to use a non-AI receiver model (S1717) and waits for a message including AI receiver application triggering to be received.

5-6. Operation of AI Receiver Evaluation Timer after UE Uses AI Receiver

While the UE uses an AI receiver according to triggering by the BS, reception performance may be lowered due to movement of the UE and change of a surrounding environment.

Figure 18:
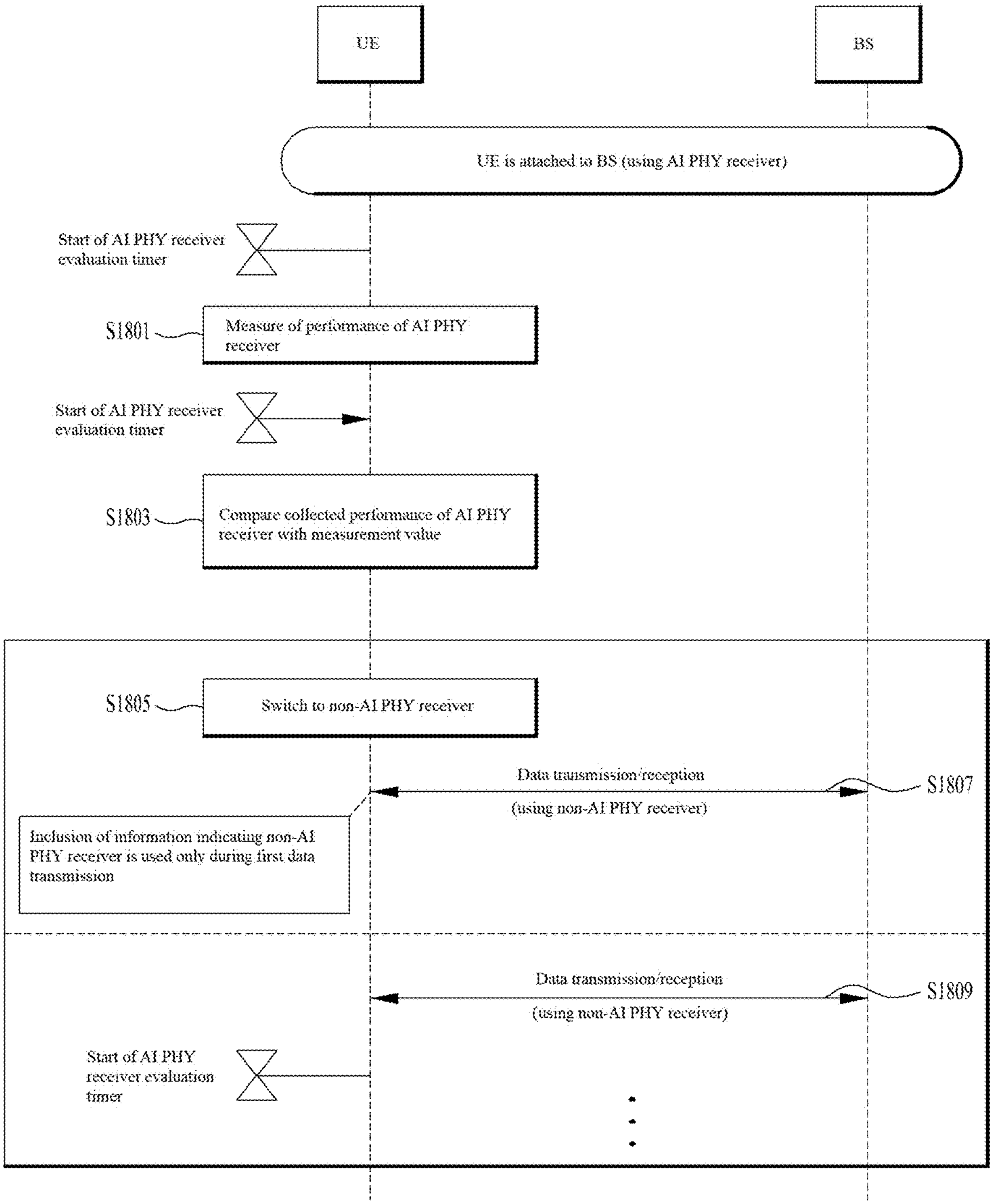
FIG. 18 is an exemplary diagram of an operation of an AI receiver evaluation timer after the UE uses an AI receiver according to the present disclosure.

FIG. 18 is an exemplary diagram of an operation of an AI receiver evaluation timer after the UE uses an AI receiver according to the present disclosure.

The UE measures performance of the AI receiver within a period of an AI receiver evaluation timer given by the BS to check whether the performance of the receiver has deteriorated (S1801). The timer period may be configured when the BS transmits AI-related information. A parameter indicating receiver performance includes a block error rate (BLER).

The UE collects and averages AI received performance parameters and compares an average result with a corresponding reference value (S1803). Taking the average serves to prevent immediate switching to an non-AI receiver caused by severe fluctuation in the measured value (e.g., reaching a peak only once).

When the performance of the average result is lower than the reference value (e.g., when a BLER is 5% or more), the UE switches to a non-AI receiver (S1805), informs the BS of switching to the non-AI receiver and, at the same time, performs data transmission and reception (S1807). Otherwise, the UE performs performance measurement by starting the AI receiver evaluation timer again while transmitting and receiving data using the AI receiver (S1809).

5-7. Occurrence of Frequent Movement Between Zones—Use of AI Receiver List

Figure 19:
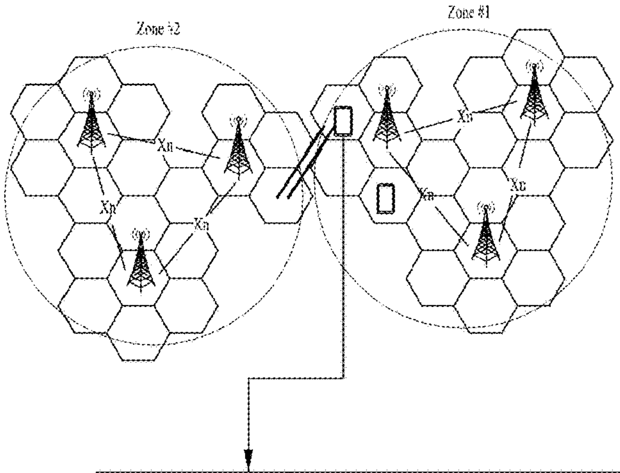
FIG. 19 is an exemplary diagram illustrating an AI receiver list when a UE frequently moves between zones according to the present disclosure.

FIG. 19 is an exemplary diagram illustrating an AI receiver list when a UE frequently moves between zones according to the present disclosure.

If an AI receiver related configuration is frequently transmitted by the BS due to frequent movement of the UE between zones, overhead increases in terms of signaling. To solve this, the UE may operate a list for managing received AI receivers and configures the maximum number of AI receivers to be stored in consideration of the sizes of the AI receivers.

If it is determined that the UE manages the list of the AI receivers, a scenario for managing the list is as follows:

(1) When the UE is located in zone #1, the UE stores information about an AI receiver related to zone #1 (a zone number, an AI receiver model, and version information) and indicates that the corresponding receiver is running (displays Running in a recent usage time). Then, the UE measures time from a time point when the AI receiver in the corresponding zone is used.

(2) When the UE moves to zone #2, since the UE does not have information about an AI receiver related to zone #2, the UE switches from the AI receiver related to zone #1 to a non-AI receiver. In this case, the UE stops measuring the usage time of the AI receiver related to zone #1 and records a relevant duration (usage time of the AI receiver), time at which switching is performed (recent usage time), and the number of times of usage (the number of times of recent usage).

(3) The UE stores information about an AI receiver related to zone #2, indicates that the corresponding receiver is running, and then measures time from a time point when the AI receiver in zone #2 is used.

(4) Upon moving from zone #2 to zone #1 again, the UE confirms that a zone number is in the list when the BS transmits a zone number, and the UE switches to the AI receiver corresponding to zone #1. In this case, the UE stops measuring the usage time of the AI receiver related to zone #2 and records a relevant duration (usage time of the AI receiver), a recent usage time, and the number of times of recent usage.

(5) If the UE frequently moves between zone #1 and zone #2, the process of (4) is repeated (the zone number may be changed).

5-8. Method of Managing AI Receiver List when Using AI Receiver List

Figure 20:
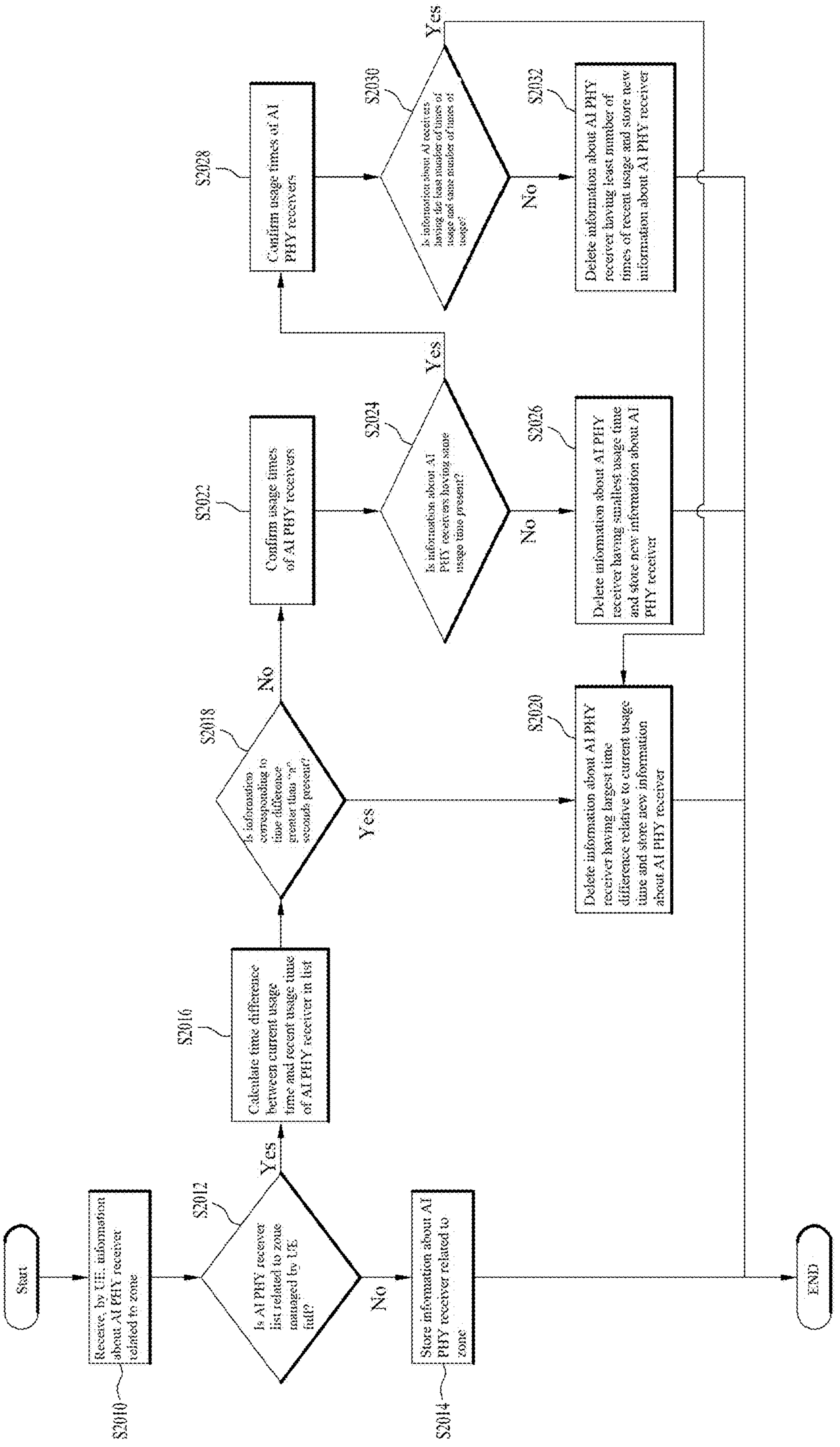
FIG. 20 is an exemplary diagram of a management method when using an AI receiver list according to the present disclosure.

FIG. 20 is an exemplary diagram of a management method when using an AI receiver list according to the present disclosure, and FIG. 21 is an exemplary diagram illustrating an AI receiver list according to the present disclosure.

When the UE manages AI receivers as a list, it is necessary to manage the list when the list is full. For management, three factors (total usage time of an AI receiver, recent usage time, and number of times of recent usage) are used. A management method of the list using the factors is as follows.

(1) The UE calculates the difference between a current usage time and recent usage time of the AI receiver (S2016) and checks whether the time difference exceeds “a” seconds (S2018). The UE deletes information having the largest time difference among information exceeding a corresponding value and inserts new information (S2020). Here, the “a” seconds serve to prevent simply deleting the oldest information about the AI receiver relative to the current usage time when managing the list, so that information about AI receivers related to corresponding zones is maintained when there is frequent movement of the UE between zones. The “a” seconds may be determined by the BS as a duration or may be determined by the UE itself (2) If all AI receivers in the list are used within the “a” seconds, the UE compares total usage times of the AI receivers, deletes information about an AI receiver having the shortest usage time (the smallest usage time), and inserts new information about an AI receiver (S2026).

(3) In step (2), if there is information about AI receivers having the shortest total usage time and the same usage time, the UE checks the number of times of recent usage (S2028), deletes an AI receiver having the least number of times of usage, and adds new information about an AI receiver (S2030 and S2032).

(4) If none of the receivers is selected even through the processes of (1) to (3), the UE deletes information about an AI receiver information with the largest difference between the current usage time and the recent usage time and adds new information about an AI receiver (S2020).

For methods performed by the UE or the BS, the above proposed methods of the present disclosure and combinations thereof are incorporated by reference.

Through the present disclosure, a plurality of BSs has one trained AI receiver using a zone formed by BSs, rather than each BS having a trained AI receiver, so that frequent switching of AI receivers does not occur.

In addition, through the present disclosure, a large amount of learning data may be secured through periodic data exchange between BSs using a zone formed by the BSs and an AI receiver model which is more effective for data transmission and reception may be efficiently secured.

According to the present disclosure, a procedure according to cell selection, cell reselection, and handover of the UE is newly introduced in using the AI receiver.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

It will be appreciated by those skilled in the art that the present disclosure can be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method and apparatus for efficiently operating a receiver model according to the state of a UE based on machine learning may be industrially used in various wireless communication systems such as a 3GPP LTE/LTE-A system and a 5G/6G communication system.

The invention claimed is:

1. A method performed by a user equipment (UE), the method comprising:
- receiving system information;
- receiving a synchronization signal;
- performing a synchronization with a base station (BS) based on the synchronization signal;
- receiving configuration information; and
- receiving data based on the configuration information,
- wherein the configuration information includes information for a first zone to which the BS belongs, and a first receiver model for the first zone, and
- wherein the first receiver model is a single artificial intelligence (AI) receiver model configured to be commonly applied for multiple BSs belonging to the first zone.

2. The method of claim 1, wherein the first receiver model is generated based on a machine learning process which includes:
- (1) learning respective receiver models by the multiple BSs;
- (2) transmitting the learned receiver models to a master BS by the multiple BSs;
- (3) generating, by the master BS, a final receiver model by combining the learned receiver models;
- (4) transmitting, by the master BS, the final receiver model to the multiple BSs;
- (5) re-learning, by the multiple BSs, the respective receiver models based on the final receiver model; and
- repeating processes of (2) to (5) a predetermined number of times,
- wherein the master BS is a BS selected from among the multiple BSs, and
- the first receiver model is generated based on the final receiver model.

3. The method of claim 2, wherein the machine learning process uses an ensemble learning method.

4. The method of claim 1, further comprising:
- reselecting a cell; and
- receiving information about a second receiver model related to the reselected cell,
- wherein the first receiver model and the second receiver model are different from each other.

5. The method of claim 4, further comprising:
- determining whether the second receiver model is updated,
- wherein the reselected cell is a cell of a BS included in the first zone.

6. The method of claim 5, further comprising:
- receiving data using the first receiver model based on non-updating of the second receiver model; and
- receiving data using the second receiver model based on updating of the second receiver model.

7. The method of claim 1, further comprising
- storing the first receiver model in a receiver list,
- wherein the receiver list is used based on a predetermined condition and includes at least one of information about a zone to which the UE belongs, a receiver model, a total usage time of a receiver, a recent usage time of a receiver, or the number of times of recent usage of a receiver, and
- the predetermined condition is movement of the UE from a zone to which the UE currently belongs to another zone.

8. A non-transitory medium which is readable by a processor and storing instructions cause the processor to perform the method of claim 1.

9. A user equipment (UE) comprising:
- at least one transceiver;
- at least one processor; and
- at least one memory operably connected to the at least one processor and configured to store instructions that, when executed, cause the at least one processor to perform operations comprising:
- receiving, through the at least one transceiver, system information;
- receiving a synchronization signal;
- performing a synchronization with a base station (BS) based on the synchronization signal;
- receiving, through the at least one transceiver, configuration information; and
- receiving, through the at least one transceiver, data based on the configuration information,
- wherein the configuration information includes information for a first zone to which the BS belongs, and a first receiver model for the first zone,
- wherein the first receiver model is a single artificial intelligence (AI) receiver model configured to be commonly applied for multiple BSs belonging to the first zone.

10. The UE of claim 9, wherein the first receiver model is generated based on a machine learning process which includes:
- (1) learning respective receiver models by the multiple BSs;
- (2) transmitting the learned receiver models to a master BS by the multiple BSs;
- (3) generating, by the master BS, a final receiver model by combining the learned receiver models;
- (4) transmitting, by the master BS, the final receiver model to the multiple BSs;
- (5) re-learning, by the BSs within the first zone, the respective receiver models based on the final receiver model; and
- repeating processes of (2) to (5) a predetermined number of times,
- wherein the master BS is a BS selected from among the multiple BSs, and
- the first receiver model is generated based on the final receiver model.

11. The UE of claim 9, the operations further comprising:
- reselecting a cell; and
- receiving information about a second receiver model related to the reselected cell,
- wherein the first receiver model and the second receiver model are different from each other.

12. The UE of claim 9, the operations further comprising:
- storing the first receiver model in a receiver list,
- wherein the receiver list is used based on a predetermined condition and includes at least one of information about a zone to which the UE belongs, a receiver model, a total usage time of a receiver, a recent usage time of a receiver, or the number of times of recent usage of a receiver, and wherein the predetermined condition is movement of the UE from a zone to which the UE currently belongs to another zone.

13. A method performed by a base station (BS), the method comprising:

transmitting system information;

transmitting a synchronization signal;

performing a synchronization with a user equipment (UE) based on the synchronization signal;

transmitting configuration information; and transmitting data based on the configuration information, wherein the configuration information includes information for a first zone to which the BS belongs, and a first receiver model for the first zone, wherein the first receiver model is a single artificial intelligence (AI) receiver model configured to be commonly applied for multiple BSs belonging to the first zone.

14. A base station (BS) comprising:

at least one transceiver;

at least one processor; and at least one memory operably connected to the at least one processor and configured to store instructions that, when executed, cause the at least one processor to perform operations comprising:

transmitting, through the at least one transceiver, system information;

transmitting a synchronization signal;

performing a synchronization with a user equipment (UE) based on the synchronization signal;

transmitting, through the at least one transceiver, configuration information; and transmitting, through the at least one transceiver, the data based on the configuration information, wherein the configuration information includes information for a first zone to which the BS belongs, and a first receiver model for the first zone, and wherein the first receiver model is a single receiver artificial intelligence (AI) model configured to be commonly applied for multiple BSs belonging to the first zone.

15. An apparatus comprising:

at least one processor; and at least one memory operably connected to the at least one processor and configured to store instructions that, when executed, cause the at least one processor to perform operations comprising:

receiving system information;

performing a synchronization with a base station (BS);

receiving control information related to a reception of data, wherein the control information is received through downlink control information; and receiving the data based on the control information, wherein the control information includes information for a first zone to which the BS belongs, and a first receiver model for the first zone, and wherein the first receiver model is a single artificial intelligence (AI) receiver model configured to be commonly applied for multiple BSs belonging to the first zone.

* * * * *